US008278783B2

(12) United States Patent
Nishijima

(10) Patent No.: US 8,278,783 B2
(45) Date of Patent: Oct. 2, 2012

(54) POWER SUPPLY APPARATUS

(75) Inventor: Kimihiro Nishijima, Oita (JP)

(73) Assignee: Oita University (JP)

( * ) Notice: Subject to any disclaimer, the term of this patent is extended or adjusted under 35 U.S.C. 154(b) by 0 days.

(21) Appl. No.: 12/680,693

(22) PCT Filed: Dec. 22, 2009

(86) PCT No.: PCT/JP2009/071284
§ 371 (c)(1),
(2), (4) Date: Mar. 29, 2010

(87) PCT Pub. No.: WO2010/074055
PCT Pub. Date: Jul. 1, 2010

(65) Prior Publication Data
US 2011/0260706 A1    Oct. 27, 2011

(30) Foreign Application Priority Data
Dec. 24, 2008    (JP) .................................. 2008-327675

(51) Int. Cl.
*H01H 9/54*    (2006.01)
(52) U.S. Cl. ....................................................... 307/140
(58) Field of Classification Search ................... 307/140
See application file for complete search history.

(56) References Cited

U.S. PATENT DOCUMENTS
2011/0037324 A1*    2/2011   Perper et al. .................. 307/140

FOREIGN PATENT DOCUMENTS
| JP | 2002-044941 A | 2/2002 |
| JP | 2007-020316 A | 1/2007 |
| JP | 2007-124850 A | 5/2007 |
| JP | 2007-221981 A | 8/2007 |

* cited by examiner

*Primary Examiner* — Robert L. Deberadinis
(74) *Attorney, Agent, or Firm* — Akerman Senterfitt

(57) ABSTRACT

To provide a power supply apparatus that can supply a large current and a small current to a load circuit in a switchable manner, with a minimum circuit scale and an efficient use of electronic devices and elements contained in conventionally used power supply apparatuses. The power supply apparatus 1 includes a power source 5 that supplies power to a load circuit 4 via one of a first path 2 and a second path 3, a switching unit 6 that switches between the first path 2 and the second path 3, a first switch 7 that controls a supply period that provides a reference for a first level of power supplied via the first path 2, a driver 10 including an open/close switch 8 that controls timing of opening and closing of the first switch 7, and a second switch 9 that controls a supply period that provides a reference for a second level of power supplied via the second path 3, wherein the first level of power is higher than the second level of power, the first path 2 runs through outside of the driver 10 while the second path 3 runs through inside of the driver, and the open/close switch 8 and the second switch 9 are a common element.

12 Claims, 17 Drawing Sheets

POWER SUPPLY APPARATUS

TECHNICAL FIELD

The present invention relates to a power supply apparatus capable of supplying power to a load circuit while switching levels of power being supplied, the invention being applicable to, for example, power supply circuits, switching power sources, and switching power source circuits.

BACKGROUND ART

Conventionally, power supply apparatuses such as switching power sources or power supply circuits that supply electrical power (voltage or current) from a power source to a load circuit have been used in electronic circuits or electronic equipments. Such power supply apparatus may be implemented, for example, as DC-DC converter devices.

Electronic equipments in recent years have been desired to have lower power consumption and standby power requirement. Load circuit operations include some modes that require high power and other modes that require low power. In particular, most electronic equipments include a central processing unit (hereinafter referred to as "CPU") and software that is run on the CPU. CPU operations often include some modes that require high power and other modes that require low power, and software, too, often includes some modes that require high power and other modes that require low power. For example, when the software is performing only a display function, the CPU on which the software is running requires low power, while, when the software is performing calculations, the CPU on which the software is running requires high power.

Conventional power supply apparatuses include a power source, a pulse switch that controls the level of power sent from the power source in accordance with pulse width (pulse width modulation or PWM), and a driver that controls the opening and closing of the pulse switch. A power supply apparatus with such a configuration could vary the level of power supplied to the load circuit only to a limited extent and could not sufficiently reduce power consumption in the low power mode or standby mode.

In a power supply apparatus with such a configuration, there were limitations in varying a level of power supplied to the load circuit, and it was impossible to sufficiently reduce power consumption in the low power mode or standby mode.

Another problem particularly associated with switching power sources is that, since the main circuit unit that transmits electrical power to a load is designed to have device characteristics suited for heavy load applications that require a large load current, it is difficult to improve power efficiency of the main circuit unit for light load applications that require only a small load current.

Accordingly, a hybrid type power supply apparatus (DC-DC converter) has been proposed (see, for example, Patent Document 1), which includes a plurality of paths for respectively supplying different levels of power to a load circuit, and a driver that switches between the plurality of paths.

Patent Document 1: Japanese Published Unexamined Patent Application No. 2007-221981

DISCLOSURE OF THE INVENTION

Problems to be Solved by the Invention

In the DC-DC converter disclosed in Patent Document 1, a resistance is connected to the switch that changes over between the plurality of power supply paths so as to reduce the response time.

However, the DC-DC converter disclosed in Patent Document 1 includes the plurality of paths for supplying different levels of power as well as various devices such as switches that form these paths separately for each path, and therefore entails the problems of increased circuit scale and cost. Thus the existing converter was not satisfactory as it failed to be a power supply apparatus that is low in cost, yet can efficiently cover a wide range of loads from low load to high load.

In view of the above problems, an object of the present invention is to provide a power supply apparatus that can efficiently cover a wide range of loads from low load to high load with a minimum circuit scale, by being able to switch over between high power output and low power output for the load circuit, with an efficient use of electronic devices and elements contained in existing power supply apparatuses.

A power supply apparatus according to a first aspect of the present invention includes a power source that supplies power to a load circuit via one of a first path and a second path that is different from the first path, a switching unit that switches over between the first path and the second path, a first switch that controls a supply period that provides a reference for a first level of power supplied via the first path, a driver including an open/close switch that controls timing of opening/closing of the first switch, and a second switch that controls a supply period that provides a reference for a second level of power supplied via the second path. The first level of power is higher than the second level of power. The first path runs through outside of the driver while the second path runs through inside of the driver. The open/close switch and the second switch are a common element.

With this configuration, high power that is the first level of power and low power that is the second level of power can be supplied to the load circuit via different paths without increasing the circuit scale. The power levels are controlled by respective devices corresponding to the power levels so that unnecessary loss or consumption of power can be restricted.

The power supply apparatus according to a second aspect of the present invention includes, in addition to the features of the first invention, a step-down converter formed by the first switch and an inductor. The step-down converter generates an output voltage lower than an input voltage of the power source by switching of the first switch, and supplies power to the load circuit via the first path.

With this configuration, an output voltage lower than the input voltage of the power source can be supplied to the load circuit.

The power supply apparatus according to a third aspect of the present invention includes, in addition to the features of the first invention, a step-up converter formed by the first switch and an inductor. The step-up converter generates an output voltage higher than an input voltage of the power source by switching of the first switch, and supplies power to the load circuit via the first path.

With this configuration, an output voltage higher than the input voltage of the power source can be supplied to the load circuit.

In the power supply apparatus according to a fourth aspect of the present invention, in addition to the features of the first invention, the first switch and the second switch respectively include a first pulse switch and a second pulse switch that switch over between supply and stop of power based on time. The first pulse switch and the second pulse switch control supply periods based on pulse width so that the first level of power and the second level of power are determined by the pulse width.

With this configuration, the first and second levels of power are controlled accurately.

In the power supply apparatus according to a fifth aspect of the invention, in addition to the features of the fourth invention, the first pulse switch and the second pulse switch respectively include a MOS transistor that is controlled to open and close by a signal input to the gate terminal thereof.

With this configuration, the opening and closing periods that determine the pulse width can be readily controlled.

In the power supply apparatus according to a sixth aspect of the invention, in addition to the features of the fifth invention, the second pulse switch includes a pair of series-connected MOS transistors.

With this configuration, the opening and closing periods that determine the pulse width can be readily controlled.

In the power supply apparatus according to a seventh aspect of the invention, in addition to the features of the above fifth invention, when the switching unit selects the first path, an output of the open/close switch is input to the gate of the MOS transistor contained in the first pulse switch so as to control opening and closing periods of the first pulse switch, which determine the supply period, which in turn determines the first level of power, whereas when the switching unit selects the second path, opening and closing periods of the second pulse switch determine the supply period which in turn determines the second level of power.

With this configuration, the first level of power that is high power and the second level of power that is low power are readily controlled. Further, as the second level of power that is low power is controlled by the opening and closing periods of the second pulse switch which is a small device, switching loss can be minimized.

In the power supply apparatus according to an eighth aspect of the invention, in addition to the features of the first invention, the load circuit further includes a detector that detects which of the first and second levels of power is required.

With this configuration, the power supply apparatus can reliably control the level of power to be supplied.

In the power supply apparatus according to a ninth aspect of the invention, in addition to the features of the eighth invention, the detector detects which of the first and second levels of power is required based on an operation mode of the load circuit.

With this configuration, the power supply apparatus can supply power correspondingly to the contents of load circuit operation.

The power supply apparatus according to a tenth aspect of the invention further includes, in addition to the features of the first invention, a controller that controls selection of one of the first path and the second path at the switching unit.

With this configuration, the switching between the paths can be readily performed. The switching between the paths can be done appropriately, particularly by being based on a detection result from the detector.

The power supply apparatus according to an eleventh aspect of the invention further includes, in addition to the features of the first invention, a switch controller that controls timing of the opening and closing of the second switch.

With this configuration, the supply periods that form the basis of control of the first and second levels of current are suitably controlled.

In the power supply apparatus according to a twelfth aspect of the invention, in addition to the features of the first invention, the power source is formed by a first power source for supplying power to the load via the first path, and a second power source different from the first power source for supplying power to the load via the second path.

With this configuration, the voltage applied to the driver can be independently set by the second power source, not depending on the input voltage from the first power source.

Effects of the Invention

The power supply apparatus of the present invention can supply high power and low power to a load circuit in a switchable manner in accordance with the needs of the load circuit while minimizing an increase in circuit scale. This obviously reduces the circuit area and costs, and thus a power supply apparatus that can efficiently cover a wide range of loads from light load to heavy load can be provided.

In addition, by the use of the driver contained in the switching power source which is designed in consideration of noise effects, it is hardly affected by noise.

BEST MODES FOR CARRYING OUT THE INVENTION

Hereinafter, embodiments of the invention will be described with reference to the drawings.

The power supply apparatus may be implemented as any of an electronic circuit, semiconductor IC, and electronic device, and its control may be partly implemented by a logic circuit or software program. The power supply apparatus may be provided on its own, or supplied in combination with another electronic circuit.

Embodiment 1

Figure 1:
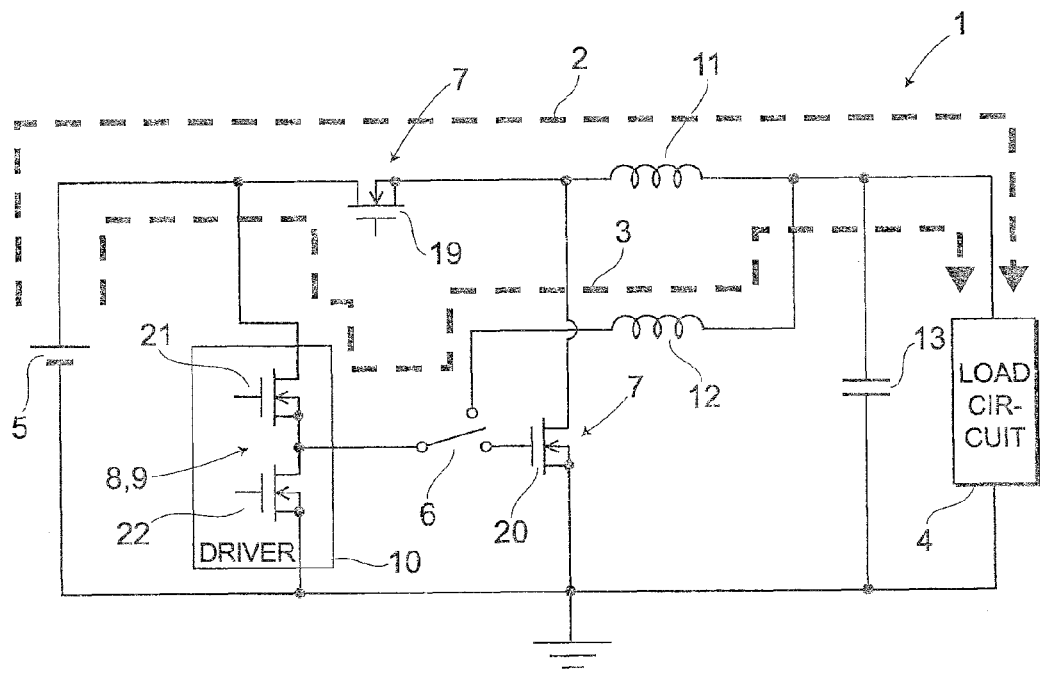
FIG. 1 is a circuit diagram of the power supply apparatus according to a first embodiment of the invention.

First, the overall structure of the power supply apparatus according to a first embodiment will be described with reference to FIG. 1. FIG. 1 is a circuit diagram of the power supply apparatus applied to a step-down converter in the first embodiment of the invention.
(Overall Structure)

The power supply apparatus 1 includes a power source 5 that supplies power to a load circuit 4 via one of a first path 2 and a second path 3, a switching unit 6 that switches between the first path 2 and the second path 3, a first switch 7 that controls a first level of power supplied via the first path 2, an open/close switch 8 that controls timing of the opening and closing of the first switch 7, a driver 10 including the open/close switch 8, and a second switch 9 that controls a second level of power supplied via the second path 3. The open/close switch 8 and the second switch 9 are an identical, common element.

The power supply apparatus 1 further includes, as a filter for smoothing the waveform input to the load circuit 4, a first inductor 11 connected to the first path 2, a second inductor 12 connected to the second path 3, and an output capacitor 13 parallel-connected to the load circuit 4.

Here, in order to supply a voltage lower than a power source voltage from the power source 5 to the load circuit 4 via the first path 2, a first step-down chopper circuit is formed by the first switch 7, first inductor 11, and output capacitor 13. Also, in order to supply a voltage lower than the voltage input from the power source 5 to the load circuit 4 via the second path 3 that is different from the first path 2, a second step-down chopper circuit is formed by the second switch 9, second inductor 12, and output capacitor 13.

The first switch 7 is configured to include MOS transistors 19 and 20 that are both N-type. The drain terminal of the MOS transistor 19 is connected to the positive terminal of the power source 5, while the source terminal of the MOS transistor 19 is connected to one terminal of the first inductor 11. The drain terminal of the MOS transistor 20 is connected to the source terminal of the MOS transistor 19, while the drain terminal of the MOS transistor 19 is connected to the negative terminal of the power source 5 and grounded therewith. To the other terminal of the inductor 11 is connected one terminal of the output capacitor 13 and one terminal of the load circuit 4, respectively, while the other terminals of the output capacitor 13 and load circuit 4 are both grounded, thus forming the above-noted first step-down chopper circuit.

The driver 10 includes the open/close switch 8, which includes a pair of N-type MOS transistors 21 and 22 series-connected across both terminals of the power source 5. Here, the drain of the MOS transistor 21 is connected to the positive terminal of the power source 5, the source of the MOS transistor 21 is connected to the drain of the MOS transistor 22, and the source of the MOS transistor 22 is grounded. The connection point between the MOS transistors 21 and 22 is connected to the gate terminal of the MOS transistor 20 via the switching switch 6.

Although the power supply apparatus 1 is illustrated in FIG. 1 as including the load circuit 4, the power supply apparatus 1 may or may not include the load circuit 4. For example, the parts other than the load circuit 4 may be regarded as the power supply apparatus, and the whole system including the load circuit 4 may be regarded as an electronic circuit.

The first path 2, as clear from FIG. 1, is the shortest path that connects the power source 5 to the load circuit 6, running outside the driver 10. On the other hand, the second path 3 runs inside the driver 10 and connects the power source 5 to the load circuit 4. The level of power supplied via the first path 2 is defined as a first level of power, and the level of power supplied via the second path 3 is defined as a second level of power. In order for the first power level to be larger than the second power level, various devices of the first step-down chopper circuit are selected from those that are designed for higher power applications than those of the devices of the second step-down chopper circuit.

Thereby, when the load circuit 4 requires high power, the first path 2 that supplies the first level of power which is high power is selected, while, when the load circuit 4 requires low power, the second path 3 that supplies the second level of power which is low power is selected.

The switching unit 6 is formed by a mode changing switch as shown in FIG. 1. When the driver 10 is short-circuited to the MOS transistor 20, power is supplied to the load circuit 4 via the first path 2 that connects the power source 5 to the load circuit 4. At this time, the first level of power supplied from the power source 5 to the load circuit 4 via the first path 2 is controlled by the opening and closing of the MOS transistors 19 and 20 that form the first switch 7.

On the other hand, when the driver 10 is short-circuited to the second inductor 12 by the switching unit 6, power is supplied to the load circuit 4 via the second path 3. At this time, the second level of power supplied from the power source 5 to the load circuit 4 via the second path 3 is controlled by the opening and closing of the MOS transistors 21 and 22 that form the second switch 9.

When the load circuit 4 requires only low power, it is much better in reducing power loss or consumption to supply power to the load circuit 4 using the second path 3 that supplies the second level of power which is low power rather than supplying power to the load circuit 4 using the first path 2 that supplies the first level of power which is high power.

When power is supplied to the load circuit 4 via the first path 2, the first level of power is controlled based on opening and closing periods of the MOS transistors 19 and 20 that form the first switch 7. Here, since the power supply via the first path 2 is executed by the switching unit 6 when the load circuit 4 is in a normal load or a heavy load state, the first switch 7 needs to be formed by large devices in consideration of withstand voltage or operation performance. On the other hand, small devices will suffice for the open/close switch 8 (namely, the second switch 9) in terms of withstand voltage or operation performance, since it only needs to switch the first switch 7 between open and closed states.

When power is supplied to the load circuit 4 via the second path 3, the second level of power is controlled based on opening and closing periods of the MOS transistors 21 and 22 that form the second switch 9. Here, since the power supply via the second path 3 is executed by the switching unit 6 when the load circuit 4 is in a light load state, the second level of power supplied via the second path 3 can be made low and from this point of view as well, small devices will be sufficient for the second switch 9.

Namely, large devices are required for the first switch 7, while small devices suffice for the second switch 9. The larger the capacity of the device that forms the switch is, the larger the power loss becomes at the time of an on-off action of the switch, which leads to larger power consumption of the entire power supply apparatus 1. Therefore, when the load circuit 4 requires only low power, it is preferable to control the power level by the second switch 9 made of small devices rather than controlling the power level by the first switch 7 made of large devices.

As described above, in order to supply power to the load circuit 4 that requires high power or low power by switching between a high power mode and a low power mode while preventing increases in power loss and power consumption, it is preferable to switch between the first path 2 using the first switch 7 acting as a large device and the second path 3 using the second switch 9 acting as a small device.

The power supply apparatus 1 thus switches between the first path 2 and the second path 3 by the switching unit 6, controls the first level of power supplied via the first path 2 by the first switch 7 (which is controlled by the open/close switch 8), and controls the second level of power supplied via the second path 3 by the second switch 9.

Since the second switch 9 is the same element as the open/close switch 8 which controls the opening and closing timing of the first switch 7, no additional circuit device is needed. The second switch 9 is the open/close switch 8 itself, which is an essential element for determining the opening and closing timing of the first switch 7, and therefore the second switch 9 that is necessary for controlling the current level of the second path 3 does not necessitate addition of any circuit device.

Also, the second path 3 for supplying low power is configured via the second switch 9, which is the open/close switch 8 included in the driver 10 that was present in the first place, and so the second switch 9 is provided with features to prevent noise in the electronic circuit. Therefore, in the supply of the second level of power via the second path 3 using the second switch 9 (open/close switch 8), generation of any extra noise is prevented.

As described above, the power supply apparatus according to the first embodiment can supply high power and low power to the load circuit 4 in a switchable manner in accordance with the needs while preventing an increase in circuit scale, noise, loss, and power consumption, and thus a power supply apparatus that can efficiently cover a wide range of loads from light load to heavy load can be provided.

Next, various parts will be described in detail.

(Power Source)

The power source 5 generates an actual electrical power output and supplies the power to the load circuit 4. The power source 5 may be a domestic power source, batteries, or cells.

(Load Circuit)

The load circuit 4 is supplied with electrical power from the power source 5 by the power supply apparatus 1.

The load circuit 4 includes an electronic circuit, semiconductor IC, CPU, DSP (digital signal processor) or the like that perform predetermined operations when power is supplied. Whatever form the load circuit 4 may have, the load circuit 4 performs predetermined operations when power is supplied.

Since the load circuit 4 performs various operations, it may require different levels of power depending on the operations. If it is a complex operation, the load circuit 4 requires high power, while if it is a simple operation, the load circuit 4 requires low power.

Here, if the load circuit 4 is a CPU, the operation target of the load circuit 4 is mostly a software program. A software program may perform a complex operation or a simple operation depending on the user's processing. For example, when the software program is performing only a display function, the CPU on which the software program is running requires low power, while, when the software program is performing calculations, the CPU on which the software program is running requires high power. If the load circuit 4 is a CPU, in particular, the level of power the load circuit 4 requires changes rapidly as the operations of the software program change rapidly.

Thus the level of power required by the load circuit 4 can change frequently in accordance with the changes in the operations. Since the power source 5 provided in the power supply apparatus 1 is a domestic power source, cells, or batteries, the power source 5 itself can hardly change the level of power being supplied. The power supply apparatus 1 changes the period of power supply from the power source 5 by the switching of switching devices to control the level of power to the load circuit 4. However, as the load circuit 4 may require high power and low power, it is efficient to divide the loss at the time of the switching of the switching devices into the loss for large current applications and the loss for small current applications.

Accordingly, when the load circuit 4 requires a large current, power is supplied via the first path 2 that can be switched by a large device. When the load circuit 4 requires a small current, power is supplied via the second path 3 that can be switched by a small device. Thus a power supply apparatus 1 that can efficiently cover a wide range of loads from light load to heavy load can be provided.

Even if the load circuit 4 is an electronic circuit or semiconductor IC other than the CPU, the level of power required by the load circuit 4 may change with time.

While the load circuit 4 includes the term "circuit", it may include partially or wholly a logic circuit or software program in addition to the physical circuit, and may contain a memory or ROM.

(First Path, Second Path, and Switching Unit)

The power supply apparatus 1 includes the first path 2 and the second path 3 as the power supply path from the power source 5 to the load circuit 4. The first path 2 supplies power based on a first level of power which is a large current to the load circuit 4. The second path 3 supplies power based on a second level of power which is a small current to the load circuit 4. Here, the first level of power is larger than the second level of power.

The switching unit 6 switches between the first path 2 and the second path 3. The switching unit 6 is formed by a switch upstream of the MOS transistor 20 as shown in FIG. 1. When this switch is short-circuited to the MOS transistor 20, power supply to the load circuit 4 is achieved via the first path 2 from the power source 5 to the load circuit 4. At this time, while power is supplied via the first path 2, power supply via the second path 3 is shut off. This is because the switch of the switching unit 6 switches between the state connected to the MOS transistor 20 and the state connected to the second path 3. A drive signal is transmitted from the power source 5 to the first switch 7 through the driver 10.

On the other hand, when the switch of the switching unit 6 is short-circuited to the second path 3, the power supply from the power source 5 to the load circuit 4 via the first path 2 is shut off, while power supply via the second path 3 that connects the power source 5 to the load circuit 4 through the driver 10 is enabled.

While the switching unit 6 includes the mode-changing switch, it may contain other elements, and the switch may be implemented by MOS transistors. Although not shown in FIG. 1, a controller may be provided that executes the switching of the switch in the switching unit 6.

In either way, the switching unit 6 switches between the first path 2 and the second path 3 as the power supply path from the power source 5 to the load circuit 4.

(First Switch, Open/Close Switch, and Second Switch)

The first switch 7 controls the supply period, which provides a reference for the first level of power that is supplied to the load circuit 4 via the first path 2. The first switch 7 consists of the MOS transistor 19 as a main switch for short-circuiting or open-circuiting the first path 2, and the MOS transistor 20 as a synchronous rectifying switch for short-circuiting or open-circuiting the line connecting the first path 2 and the ground 11. These MOS transistors 19 and 20 are allowed to be switched together in such a manner that when one is short-circuited, the other is open-circuited, and when one is open-circuited, the other is short-circuited. Their opening and closing periods are controlled by the open/close switch 8.

On the other hand, the second switch 9 is the same element as the open/close switch 8, i.e., the open/close switch 8 serves as the second switch 9.

The second switch 9 is initially the switch for opening and closing the first switch 7, but it also determines the period of power supply from the power source 5 when power is supplied via the second path 3. The second switch 9 consists of the series-connected MOS transistors 21 and 22 and it can directly control the second path 3 to be short-circuited or open-circuited. When the MOS transistor 21 is short-circuited while the MOS transistor 22 is open-circuited, the second path 3 from the power source 5 to the load circuit 4 is conductive, and when the MOS transistor 21 is open-circuited while the MOS transistor 22 is short-circuited, the second path 3 from the power source 5 to the load circuit 4 is shut off.

As described above, the period of power supply from the power source 5 via the first path 2 is determined by the combination of the open/close switch 8 and the first switch 7. The period of power supply from the power source 5 via the second path 3 is determined by the second switch 9.

The first switch 7 and the second switch 9 may respectively include a first pulse switch and a second pulse switch that determine the opening and closing periods based on pulse widths.

The pulse switch controls the opening and closing periods of the switch based on the pulse width given to the control terminal thereof. Namely, the period in which the switch is short-circuited (close state) and the period in which the switch is open-circuited (open state) are represented as widths along the time axis on a timing chart.

For example, the level of power supplied to the load circuit 4 is determined by an integral of pulse which indicates the period in which power is supplied during a predetermined period. Since the pulse switch can control the opening and closing periods of the switch based on the pulse width, it can easily control the level of power.

For example, the longer the pulse width causing a short-circuit state, the longer the conducting period between the power source 5 and the load circuit 4, and thereby an integral increases, thus resulting in a larger level of power during the predetermined period. Conversely, the longer the pulse width causing an open-circuit state, the longer the shutoff period between the power source 5 and the load circuit 4, and thereby the integral decreases, thus resulting in a smaller level of power during the predetermined period.

In an actual electronic circuit or electronic equipment, the load circuit is not kept directly electrically connected to the power source, but the conducting period in which the power source is electrically connected to the load circuit is finely controlled along the time axis by such pulse switches as described above so as to determine the level of power to the load circuit in accordance with the integral of a predetermined period.

The pulse switch may also preferably be a MOS transistor that is controlled to open and close by an input to its gate that serves as the control terminal noted above.

The MOS transistor has three terminals, i.e., gate, source, and drain; the source and the drain are short-circuited or open-circuited in accordance with the value input to the gate. MOS transistors can be easily designed into a semiconductor IC and can form an ideal switch that can control to open and close only by the control of the gate input. Also, the withstand voltage and operation performance can be controlled by adjusting the transistor size of the MOS transistor, and therefore, by providing the first switch 7 and second switch 9 (i.e., open/close switch 8) in the form of MOS transistors, these switches can flexibly deal with various voltages or power that may be required.

Figure 2:
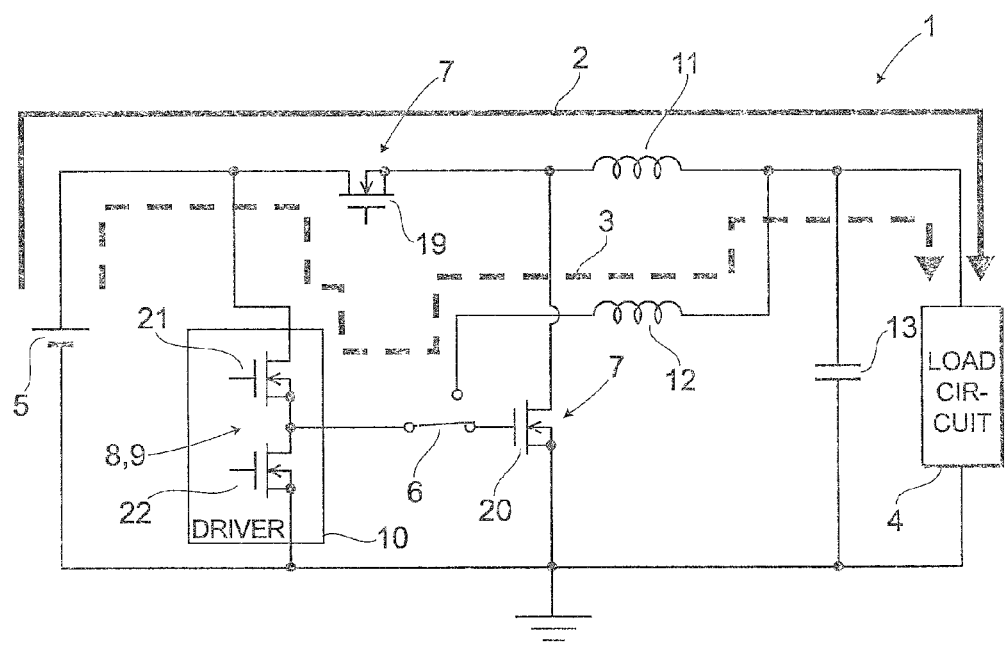
FIG. 2 is a circuit diagram showing an operating state of the power supply apparatus according to the first embodiment of the invention.
Figure 4:
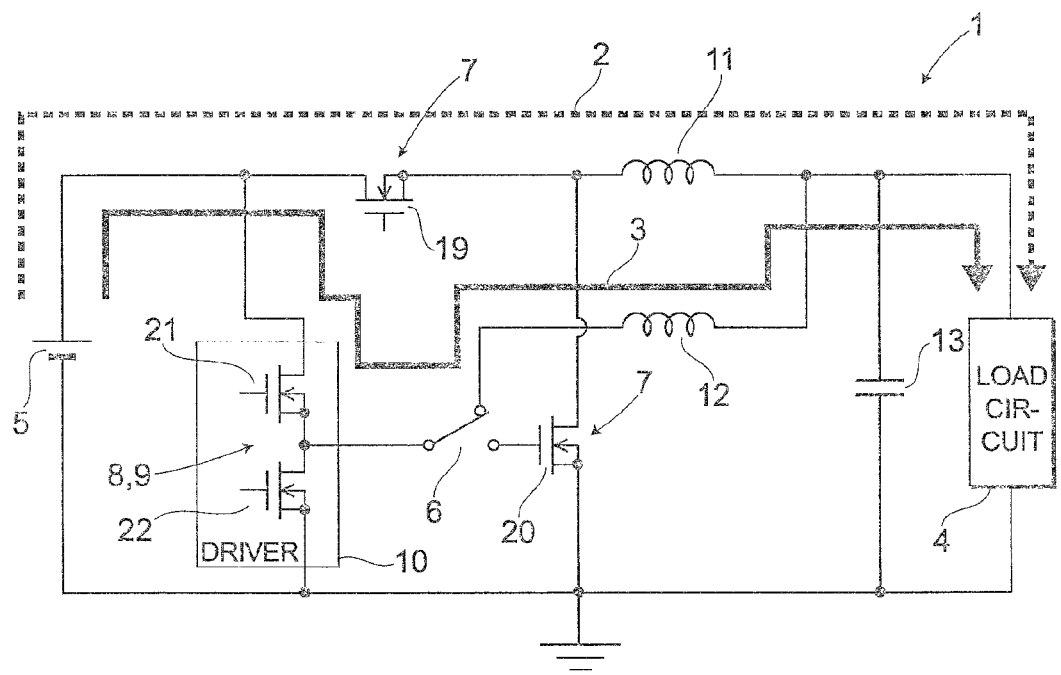
FIG. 4 is a circuit diagram showing an operating state of the power supply apparatus according to the first embodiment of the invention.

FIGS. 2 and 4 are circuit diagrams showing operating states of the power supply apparatus according to the first embodiment of the invention. FIG. 2 shows a state in which the switching unit 6 has selected the first path 2, while FIG. 4 shows a state in which the switching unit 6 has selected the second path 3. As the first switch 7 includes the MOS transistors 19 and 20, and the second switch 9 includes the MOS transistors 21 and 22, opening and closing periods represented by pulse widths can be easily formed, and thus the power supply apparatus 1 can easily control the level of power to the load circuit 4.

(Power Supply Via First Path)

Figure 3:
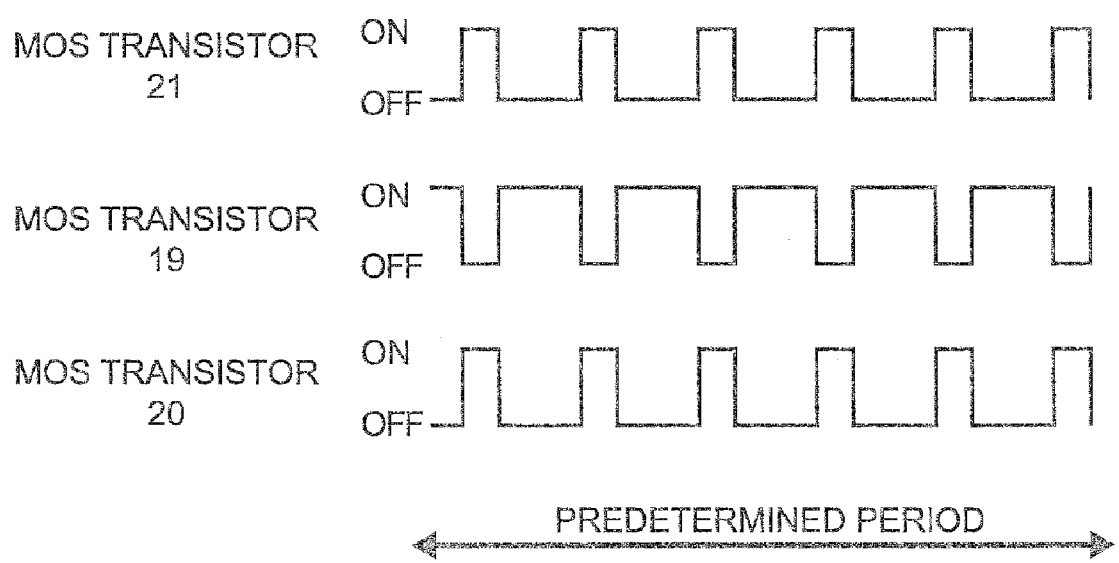
FIG. 3 is a time chart of power supply via a first path according to the first embodiment of the invention.

Next, the power supply operation via the first path 2 will be described. Here, the description will be made with regard to the case in which the first switch 7 and second switch 9 are MOS transistors. First, the power supply operation from the power source 5 to the load circuit 4 via the first path 2 will be described with reference to FIGS. 2 and 3. FIG. 3 is a time chart of power supply via the first path 2 in the first embodiment of the invention.

As shown in FIG. 2, the switching unit 6 has short-circuited across the driver 10 and the gate of the MOS transistor 20, so that the MOS transistor 20 is subjected to the control from the open/close switch 8 (second switch 9) that has the driver 10. In this state, a pulse drive signal is given from the driver 10 to the MOS transistor 20, and a different pulse drive signal is given to the MOS transistor 19, whereby the MOS transistors 19 and 20 open and close in a symmetric manner relative to each other so that power is supplied from the power source 5 to the load circuit 4 via the first path 2.

In the driver 10, the source of the MOS transistor 21 and the drain of the MOS transistor 22 are connected, and in the state shown in FIG. 2, the connection point is connected to the gate terminal of the MOS transistor 20. Whether the MOS transistor 20 is short-circuited (ON) or open-circuited (OFF) is determined by a voltage value input to the gate (whether it is a high-level voltage or a low-level voltage). Thus whether the MOS transistor 20 is short-circuited or open-circuited is determined by the short-circuit and open-circuit states of the pair of MOS transistors 21 and 22.

More specifically, pulse control signals that are symmetric to each other are respectively given to the gates of the MOS transistor 21 and 22, so that when the high-side MOS transistor 21 is short-circuited, the low-side MOS transistor 22 is open-circuited, whereby a high-level voltage is given to the gate of the MOS transistor 20 from the power source 5 via the MOS transistor 21. On the other hand, when the pulse control signals are inverted so that the MOS transistor 21 is open-circuited while the MOS transistor 22 is short-circuited, the voltage given to the gate of the MOS transistor 20 reduces to a low level, and electric charges accumulated in that gate are discharged immediately. Repeating such operations supplies a pulse drive signal from the driver 10 to the gate of the MOS transistor 20.

The MOS transistor 19 is short-circuited or open-circuited symmetrically to the MOS transistor 20. Specific examples of the driver of the MOS transistor 19 will be described in other embodiments later.

When the MOS transistor 19 is short-circuited while the MOS transistor 20 is open-circuited, power is supplied from the power source 5 to the load circuit 4 through the first inductor 11, and energy is accumulated in the first inductor 11. On the other hand, when the MOS transistor 19 is open-circuited while the MOS transistor 20 is short-circuited, the energy that has been accumulated in the first inductor 11 is successively supplied to the load circuit 4 as electrical power. At this time, a voltage lower than the power source voltage from the power source 5 is generated across both terminals of the first inductor 11 as a voltage input to the load circuit 4.

The level of power the load circuit 4 receives in a predetermined period (first power level) is determined by the opening and closing periods of the MOS transistor 19 that is cyclically and repeatedly short-circuited and open-circuited.

The pair of MOS transistors 21 and 22 should preferably be MOS transistors that operate symmetrically to each other. Namely, it is preferable that when the MOS transistor 21 is short-circuited (ON), the MOS transistor 22 should be open-circuited (OFF), and that when the MOS transistor 21 is open-circuited (OFF), the MOS transistor 22 should be short-circuited (ON). By achieving such symmetricity, when only the MOS transistor 21 is short-circuited, a signal based on the voltage of the power source 5 is supplied to the output terminals of the driver 10, whereas, when only the MOS transistor 22 is short-circuited, the signal based on the ground voltage is supplied to the output terminals of the driver 10. The output from the driver 10 is directly input to the gate terminal of the MOS transistor 20 that forms the first switch 7.

When the MOS transistor 21 is short-circuited (ON) in the pair of the MOS transistors 21 and 22, the voltage from the power source 5 is allowed to be directly input to the gate terminal of the MOS transistor 20. With the voltage from the power source 5 being directly input to the gate terminal of the MOS transistor 20, a high-level signal is input as the gate voltage of the MOS transistor 20.

Here, if the MOS transistor 20 is an N-MOS transistor, inputting a high-level signal to its gate terminal makes the MOS transistor 20 short-circuited (ON). Thus, if the MOS transistor 21 is an N-MOS transistor, in a state in which the MOS transistor 21 is short-circuited, the MOS transistor 20 is short-circuited. When the MOS transistor 20 is short-circuited, the MOS transistor 19 is open-circuited, whereby the energy accumulated in the first inductor 11 is supplied to the load circuit 4 as electrical power.

On the other hand, when the MOS transistor 22 is short-circuited (ON) (while the MOS transistor 21 is open-circuited), the gate terminal of the MOS transistor 20 is grounded, and its voltage reduces to a low level. Here, if the MOS transistor 20 is an N-MOS transistor, when its gate voltage reduces to a low level, it is open-circuited (OFF). Thus, if the MOS transistor 22 is an N-MOS transistor, in a state in which the MOS transistor 22 is short-circuited, the MOS transistor 20 is open-circuited. When the MOS transistor 20 is open-circuited, the MOS transistor 19 is short-circuited, whereby the line connecting the first path 2 to the ground 11 is shut off so that power from the power source 5 is directly supplied to the load circuit 4 through the first inductor 11. Namely, there is created a period in which power from the power source 5 is supplied during a predetermined period.

The MOS transistors 19 and 20 are thus switched as the output from the open/close switch 8 (=second switch 9) contained in the driver 10 switches between the high-level voltage and low-level voltage during a predetermined period, to supply power from the power source 5 to the load circuit 4. An integral of the period in which power is supplied at a predetermined time determines the level of power supplied to the load circuit 4 (in this case the first level of power supplied via the first path 2).

The first level of power supplied via the first path 2 will be described with reference to FIG. 3.

The time chart of FIG. 3 represents, from above, the state of the MOS transistor 21, the state of the MOS transistor 19, and the state of the MOS transistor 20. In FIG. 3, the MOS transistor 21 is short-circuited (ON) and open-circuited (OFF) repeatedly. When the MOS transistor 22 is open-circuited while the MOS transistor 21 is short-circuited, a voltage signal diverged from the power source 5 is supplied to the open/close switch 8. Note, however, that the current value of the signal which the open/close switch 8 outputs to the MOS transistor 20 is smaller than the current value flowing through the open/close switch 8 acting as part of the second path 3 to be described later.

The first switch 7 is opened or closed in accordance with the change in state of the open/close switch 8. Power is supplied from the power source 5 to the load circuit 4 in accordance with the opening and closing of the first switch 7. Here, if the period in which the MOS transistor 19 is short-circuited is long, the integral of power supplied to the load circuit 4 during a predetermined period becomes large, and therefore the first level of power is determined by the opening and closing operation of the MOS transistor 19 (namely, opening and closing operation of the open/close switch 8).

The high-level signal is a signal having a voltage higher than a predetermined potential, while the low-level signal is a signal having a voltage lower than a predetermined potential; it is a signal classified based on a potential threshold that controls the operation of the MOS transistor. The short-circuit state of the MOS transistor or switch means the same as the "ON" state, and the open-circuit state of the MOS transistor or switch means the same as the "OFF" state.

If the MOS transistor 20 is a P-MOS transistor, it operates conversely from the N-MOS transistor. Namely, when a high-level signal is input to the gate terminal, the P-MOS transistor is open-circuited, while when a low-level signal is input to the gate terminal, the N-MOS transistor is short-circuited. Namely, when a pair of MOS transistors 21 is short-circuited, the MOS transistor 20 is open-circuited. When a pair of MOS transistors 22 is short-circuited, the MOS transistor 20 is short-circuited. Thus, if the MOS transistor 20 is a P-MOS transistor, it operates precisely oppositely from the N-MOS transistor.

The MOS transistor 20 of the first switch 7 needs to accommodate high power supplied from the power source 5 at its drain terminal and source terminal, and therefore it needs to have a large device size. For this reason, the MOS transistor 20 has a large device size. This also means that a necessity to switch the MOS transistor 20 when supplying low power leads to unnecessary loss, noise, and power consumption. On the other hand, the pair of MOS transistors 21 and 22 included in the second switch 9, to which the output of the power source 5 is connected, only need to execute the opening and closing of the MOS transistor 20. Therefore, they do not need to have a high withstand voltage, but only need to have a small device size.

Accordingly, it is preferable to control the power level by the first switch 7 having a large device size when supplying the first level of power which is high power (supplied via the first path 2), while it is preferable to control the power level by the second switch 9 having a small device size via the second path 3 when supplying the second level of power which is low power.

While the open/close switch 8 has been described as having a pair of MOS transistors 21 and 22, the open/close switch 8 may have other configurations.

(Power Supply Via Second Path)

Figure 5:
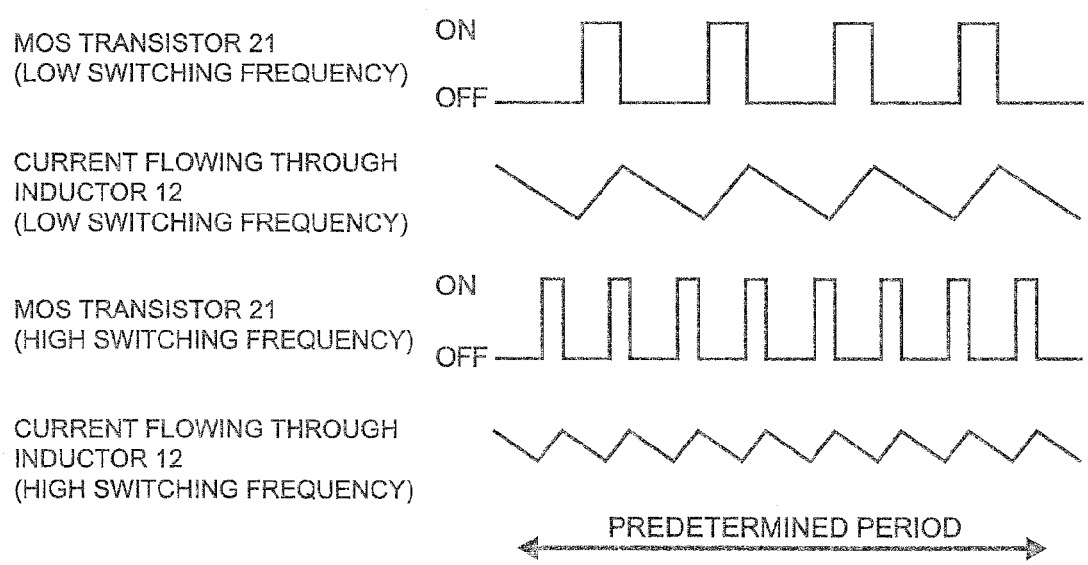
FIG. 5 is a time chart of power supply via a second path.

Next, the power supply to the load circuit 4 via the second path 3 will be described with reference to FIGS. 4 and 5. FIG. 4 is a circuit diagram showing an operating state of the power supply apparatus according to the first embodiment of the invention, and FIG. 5 is a time chart of power supply via the second path 3.

As shown in FIG. 4, the switching unit 6 has short-circuited across the driver 10 and the second inductor 12, so that the supply of the drive signal to the MOS transistor 20 is shut off, while power supply from the power source 5 via the second path 3 through the driver 10 is enabled. The actual power supply via the second path 3 is controlled by the opening and closing operation of the second switch 9 contained in the driver 10. Together with the MOS transistor 20, the MOS transistor 19 stops its switching operation.

The second switch 9 and the open/close switch 8 are a common element; they are not distinguished from each other physically or as a circuit element. The second switch 9 has the pair of MOS transistors 21 and 22 as has been described with reference to FIG. 2. Of course, the second switch 9 may have other configurations.

The source of the MOS transistor 21 paired with the MOS transistor 22 is connected to the drain of the MOS transistor 22. In the state shown in FIG. 4, the connection point is connected to one terminal of the second inductor 12.

The pair of MOS transistors 21 and 22 should preferably be both MOS transistors that operate symmetrically to each other. Namely, it is preferable that when the MOS transistor 21 is short-circuited (ON), the MOS transistor 22 is open-circuited (OFF), while when the MOS transistor 21 is open-circuited (OFF), the MOS transistor 22 is short-circuited (ON). With such symmetricity, when only the MOS transistor 21 is short-circuited, the signal supplied as an output from the driver 10 is based on the voltage of the power source 5, whereas, when only the MOS transistor 22 is short-circuited, the signal supplied as an output from the driver 10 is based on the ground voltage. As the pair of MOS transistors 21 and 22 transmit the output from the power source 5 intermittently, the power supply to the load circuit 4 via the second path 3 can be controlled only by the opening and closing of the second switch 9.

When the MOS transistor 21 is short-circuited while the MOS transistor 22 is open-circuited, the second switch 9 outputs power from the power source 5 to the second inductor 12. Namely, during the period in which the MOS transistor 21 is short-circuited (also referred to as the period in which the second switch 9 is ON), power is supplied from the power source 5 to the load circuit 4 through the second inductor 12.

On the other hand, when the MOS transistor 21 is open-circuited while the MOS transistor 22 is short-circuited, one terminal of the second inductor 12 is grounded, so that the energy that has been accumulated in the second inductor 2 is discharged to the load circuit 4. Thus, during the period in which the MOS transistor 21 is open-circuited (also referred to as the period in which the second switch 9 is OFF), the energy that has been accumulated in the second inductor 2 is supplied to the load circuit 4 as electrical power.

The second level of power supplied to the load circuit 4 via the second path 3 is determined by an integral of the period in which power is supplied from the power source 5.

Here, to supply the second level of power which is low power, the number of switching during a predetermined period may be increased.

The time chart of FIG. 5 shows the states of the MOS transistor 21 and the waveforms of the current flowing through the inductor 12. In FIG. 5, when the MOS transistor 21 is short-circuited while the MOS transistor 22 is open-circuited, power is supplied from the power source 5 to the load circuit 4 through the second inductor 12. In order to supply the second level of power which is low power, increasing the number of switching of the second switch 9 during a predetermined period can make the amplitude of the waveform of the current flowing through the inductor 12 smaller. Thereby, the inductor 12 can be made smaller, and further the conductive loss at various circuit parts can be reduced. While increasing the number of switching of the second switch 9 will increase the loss at the time of switching, this loss caused by the large number of switching hardly affects the power efficiency of the power supply apparatus 1, since the second switch 9 is formed by small devices with a small current capacity.

The second level of power is determined as described above and low power is supplied to the load circuit 4.

As described above, when the load circuit 4 requires high power, the power is supplied to the load circuit 4 via the first path 2 at the first level of power that is controlled by the opening and closing periods of the open/close switch 8 and the first switch 7. On the other hand, when the load circuit 4 requires low power, the power is supplied to the load circuit 4 via the second path 3 at the second level of power that is controlled by the opening and closing periods of the second switch 9.

Since the first switch 7 and the second switch 9 are both pulse switches that output signals determined by pulse widths (in particular, since they are MOS transistors controlled to open and close (ON/OFF) by signals input to their gate terminals), the first and second levels of power can be controlled by the opening and closing of these pulse switches. Therefore the level of power required by the load circuit 4 can be controlled precisely.

(Power Supply Apparatus Having a Controller for the Switching Unit and the Second Switch)

Figure 6:
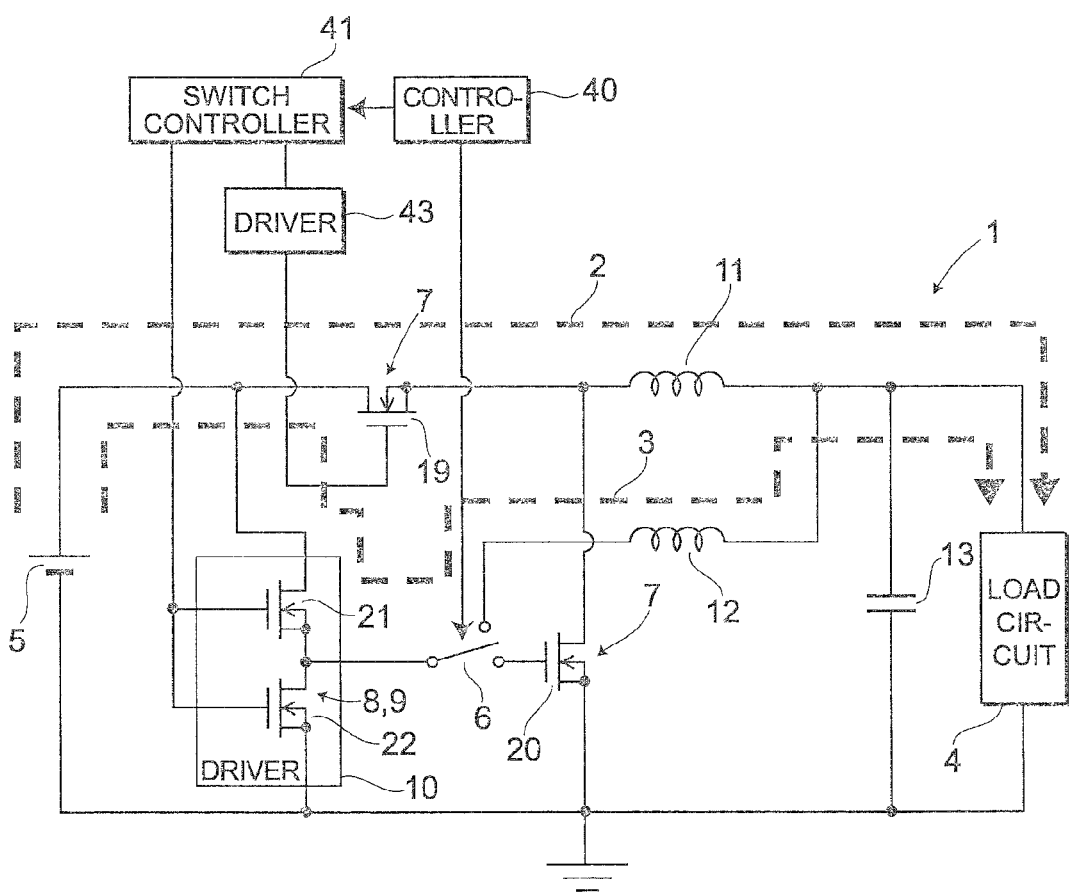
FIG. 6 is a circuit diagram of the power supply apparatus according to the first embodiment of the invention.

Next, a modified example of the configuration shown in FIG. 1 will be described with reference to FIG. 6, which additionally includes a controller 40 for causing the switching unit 6 to select one of the first path 2 and second path 3, a switch controller 41 that controls the opening and closing operations of the first switch 7 and the open/close switch 8 or the second switch 9 that are a common element, and a driver 43 for the MOS transistor 19. FIG. 6 is a circuit diagram of the power supply apparatus 1 according to the first embodiment of the invention.

The controller 40 controls selection of the path (selection of one of the first path 2 and the second path 3) in the switching unit 6.

The switching unit 6 switches between the first path 2 and the second path 3 by the opening and closing of a switch it includes. Here the controller 40 controls the opening and closing of the switch in the switching unit 6. For example, when the controller 40 is informed that the load circuit 4 requires high power (hereinafter referred to as "high power mode"), the controller 40 outputs a switch signal to the switch in the switching unit 6 to short-circuit the driver 10 to the gate of the MOS transistor 20. Contrarily, when the controller 40 is informed that the load circuit 4 requires low power (hereinafter referred to as "low power mode"), the controller 40 outputs a switch signal to the switch in the switching unit 6 to short-circuit the driver 10 to the second inductor 12.

It is preferable to further provide a detector for detecting the information regarding whether it is the high power mode or low power mode and giving this information to the controller 40. The detector is a block that has the information for controlling the load circuit 4. It determines whether an operation mode of the load circuit 4 is the high power mode or low power mode based on the control information, and outputs the information to the controller 40.

Thus the controller 40 allows the switching unit 6 to perform the path selection appropriately.

The power supply apparatus 1 may further include the switch controller 41.

The switch controller 41 controls the opening and closing operations of the MOS transistor 19 of the first switch 7 and the second switch 9 (namely, the open/close switch 8). The second switch 9 operates in two situations, when controlling the opening and closing operation of the MOS transistor 20 of the first switch 7 as the open/close switch 8, and when controlling the power supply through the second path 3. Here, the switch controller 41 controls the opening and closing timing of the MOS transistor 19 and the second switch 9 using the information on which path the switching unit 6 has selected and the information on the level of power required by the load circuit 4. Therefore, the switch controller 41 may obtain such information from the controller 40 and detector to control the opening and closing timing of the MOS transistor 19 and the second switch 9. This is because the level of power supplied to the load circuit 4 is determined by the opening and closing timing of the MOS transistor 19 and the second switch 9.

The driver 43 receives a pulse control signal from the switch controller 41 to generate a pulse drive signal that can open and close the MOS transistor 19; it has a configuration similar to the driver 10 described in the foregoing.

As described above, the power supply apparatus 1 including the controller 40 and the switch controller 41 enables supply of power in accordance with the level of power required by the load circuit 4.

(Power Supply Apparatus Having a Detector)

Next, a power supply apparatus having a detector 42 will be described with reference to FIG. 7.

Figure 7:
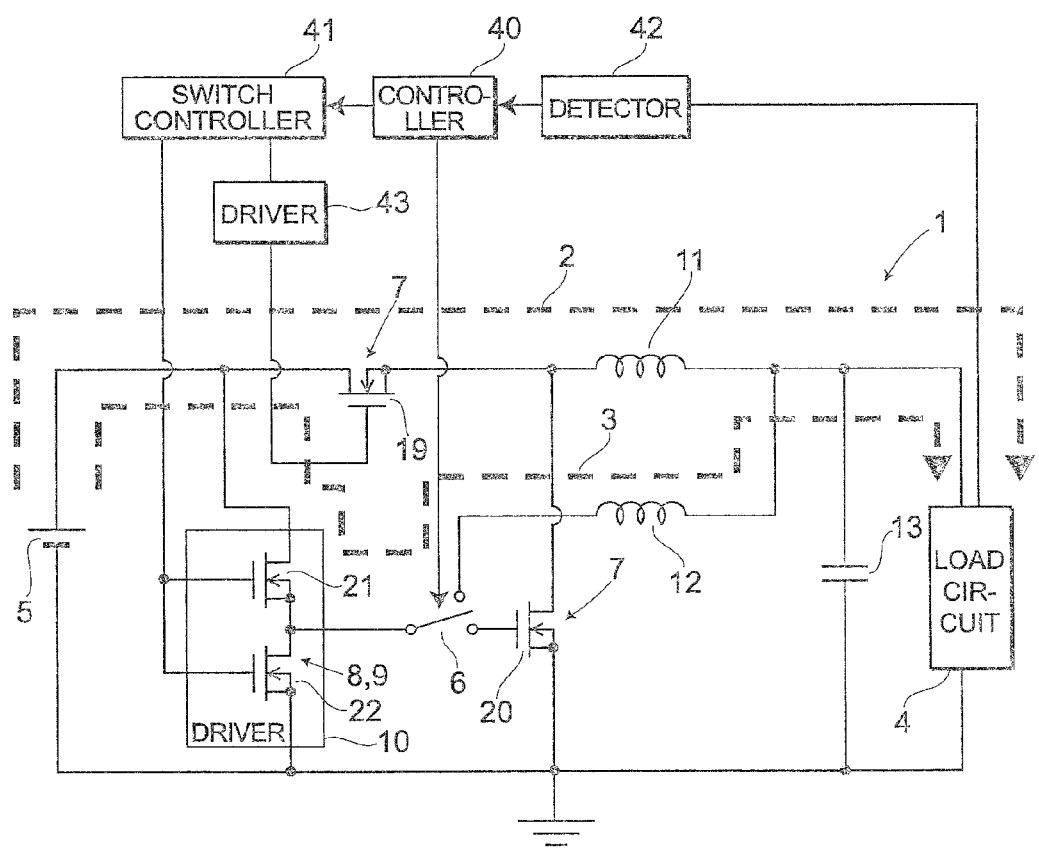
FIG. 7 is a circuit diagram of the power supply apparatus according to the first embodiment of the invention.

As is clear from FIG. 7, the power supply apparatus 1 further includes a detector 42 that detects a level of power required by the load circuit 4. The detector 42 detects, for example, whether the load circuit 4 requires the first level of power or the second level of power. Here, if the load circuit 4 is a processor such as a CPU or DSP on which a software program runs, the detector 42 detects a level of power required by the load circuit 4 based on an operation mode designated by the software program. The detector 42 further notifies the controller 40 of one of the first and second levels of power that has been detected. At this time, the detector 42 may notify, not only the result whether the first level of power or the second level of power is selected, but also an actual value of power that needs to be supplied. On receiving the result, the controller 40 controls the switching of the switching unit 6, and determines the opening and closing timing of the first switch 7 and the second switch 9 through the switch controller 41.

If the software program performs image processing, for example, the processing operation is complex and requires high power. The detector 42 detects that the load circuit 4 requires the first level of power. On the contrary, if the software program performs just file saving, the processing operation is simple and requires low power. The detector 42 detects that the load circuit 4 requires the second level of power. Alternatively, the detector may detect a specific value of the first or second level of power.

Of course, the detector 42 may detect the power level required by the load circuit 4 based on other information than the operation mode of the software program. For example, the detector 42 may detect that the load circuit 4 requires the second level of power when the load circuit 4 enters an energy saving mode in which power consumption is low.

The controller 40 controls the switching unit 6 in accordance with the detection result from the detector 42 to select the first path 2 or the second path 3. Similarly, the switch controller 41 controls the opening and closing timing of the first switch 7 and the second switch 9 in accordance with the detection result from the detector 42. When, for example, the detector 42 detects a large value as the level of power required by the load circuit 4, the switch controller 41 controls the opening and closing timing of the first switch 7 and the second switch 9 so as to make the power supply period longer.

As described above, with the detector 42 detecting a level of power required by the load circuit 4, the power supply apparatus 1 can precisely control the level of power supplied to the load circuit 4. In particular, when the load circuit 4 requires high power, the first level of power can be controlled by the first switch 7 that has a large device size capable of controlling high power. When the load circuit 4 requires low power, the second level of power can be controlled by the second switch 9 that has a small device size suitable for the control of low power.

As a result, even though the level of power that needs to be supplied varies, the power supply apparatus 1 does not allow an increase in noise, loss, and power consumption. The second level of power supplied via the second path 3 is controlled by the second switch 9, which itself is an element that is originally required for controlling the opening and closing of the first switch 7. Thus, power can be supplied as required by the load circuit 4 without increasing the scale of the circuit, either.

The power supply apparatus 1 described with reference to FIGS. 1 to 7 can be rephrased as a power supply apparatus 1 including a power source 5 that supplies power to a load circuit 4 via one of a first path 2 and a second path 3 that is different from the first path 2, a switching unit 6 that switches between the first path 2 and the second path 3, MOS transistors 19 and 20 as a first pulse switch that generates a pulse timing for determining a first level of power supplied via the first path 2, a driver 10 including MOS transistors 21 and 22 as an open/close pulse switch that controls the opening and closing timing of the first pulse switch, and MOS transistors 21 and 22 as a second pulse switch that generates a pulse timing for determining a second level of power supplied via the second path 3, wherein the first level of power is higher than the second level of power; the first path 2 runs through outside the driver 10 while the second path 2 runs inside the driver 10; the open/close pulse switch and the second pulse switch are a common element; the switching unit 6 includes a switching switch provided in midway of the line that connects the driver 10 to the MOS transistor 20 which is the first pulse switch; and the MOS transistor 20 of the first pulse switch is in a parallel-connected relationship with the power source 5 and the load circuit 4 as well as connected to the ground. Here, the first pulse switch, the open/close pulse switch, and the second pulse switch are switches that respectively switch in accordance with pulse widths given thereto, and they respectively correspond to the elements of the first switch 7, the open/close switch 8, and the second switch 9.

Second Embodiment

Next, the second embodiment will be described. In the second embodiment, the power supply apparatus applied to a step-down converter will be described with reference to FIG. 8 to FIG. 12, giving more specific examples of circuits.

FIG. 8 to FIG. 12 are block diagrams of the power supply apparatus according to the second embodiment of the invention. Each of FIG. 8 to FIG. 12 illustrates the circuit diagram having the same circuit configuration in different operation states. How a power supply apparatus 50 operates can be explained by all of FIG. 8 to FIG. 12.

Figure 8:
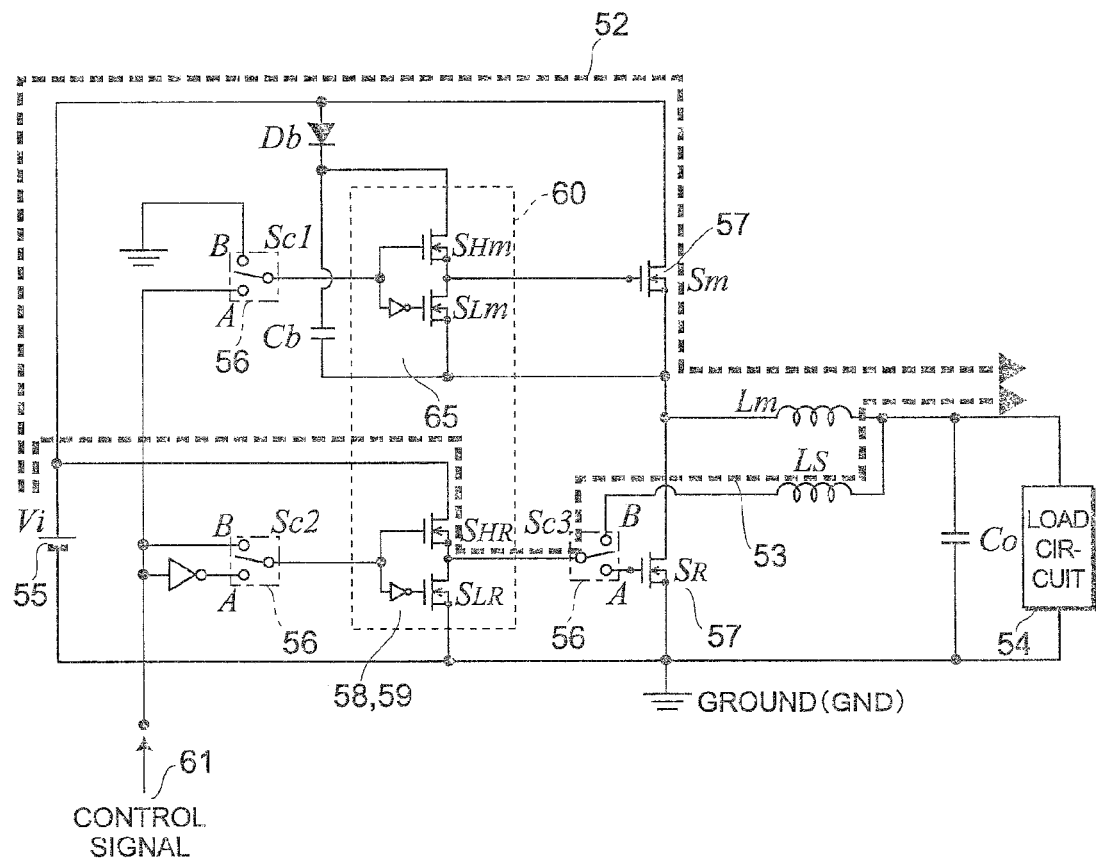
FIG. 8 is a circuit diagram of the power supply apparatus according to a second embodiment of the invention.

(1) FIG. 8 illustrates a state in which a switching unit 56 has not selected either of a first path 52 and a second path 53. It shows the circuit diagram common to FIG. 8 to FIG. 12.

Figure 9:
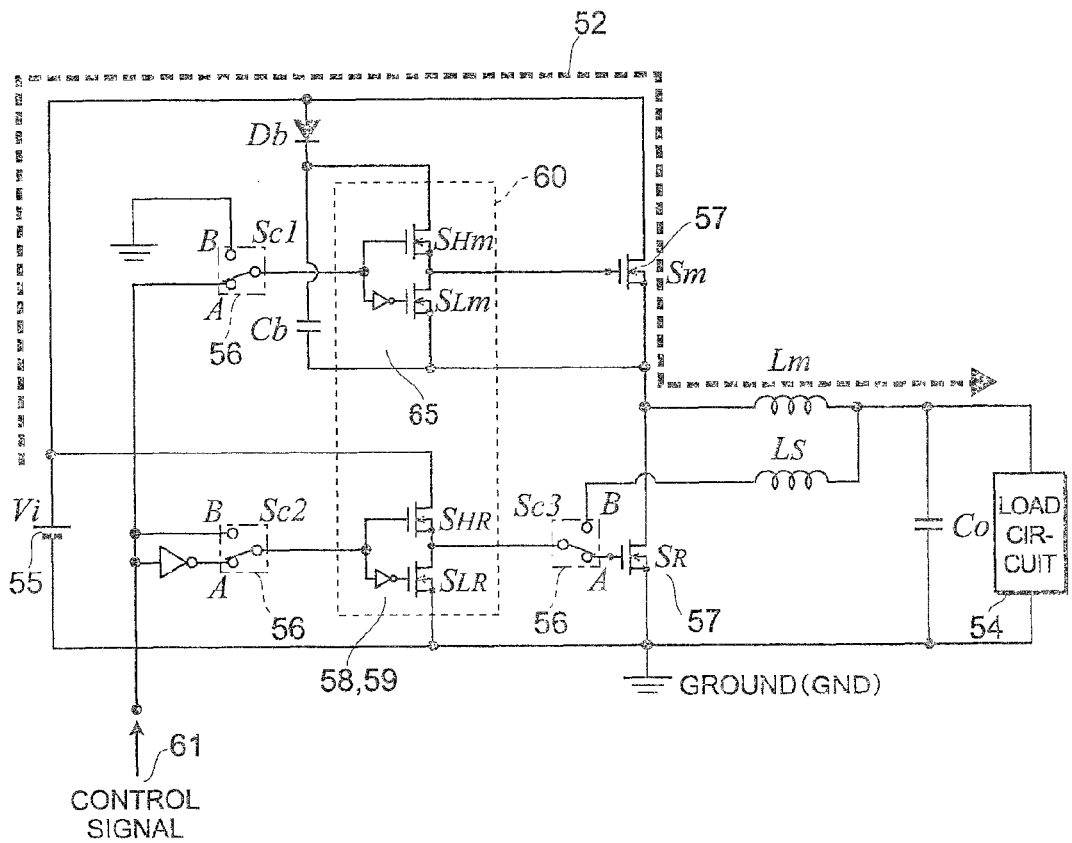
FIG. 9 is a circuit diagram showing an operating state of the power supply apparatus according to the second embodiment of the invention.

(2) FIG. 9 illustrates a state in which the switching unit 56 has selected the first path 52 so that power is supplied from a power source 55 to a load circuit 54 via the first path 52. In particular, it shows the period in which power is supplied from the power source 55 to the load circuit 54 via the first path 52.

Figure 10:
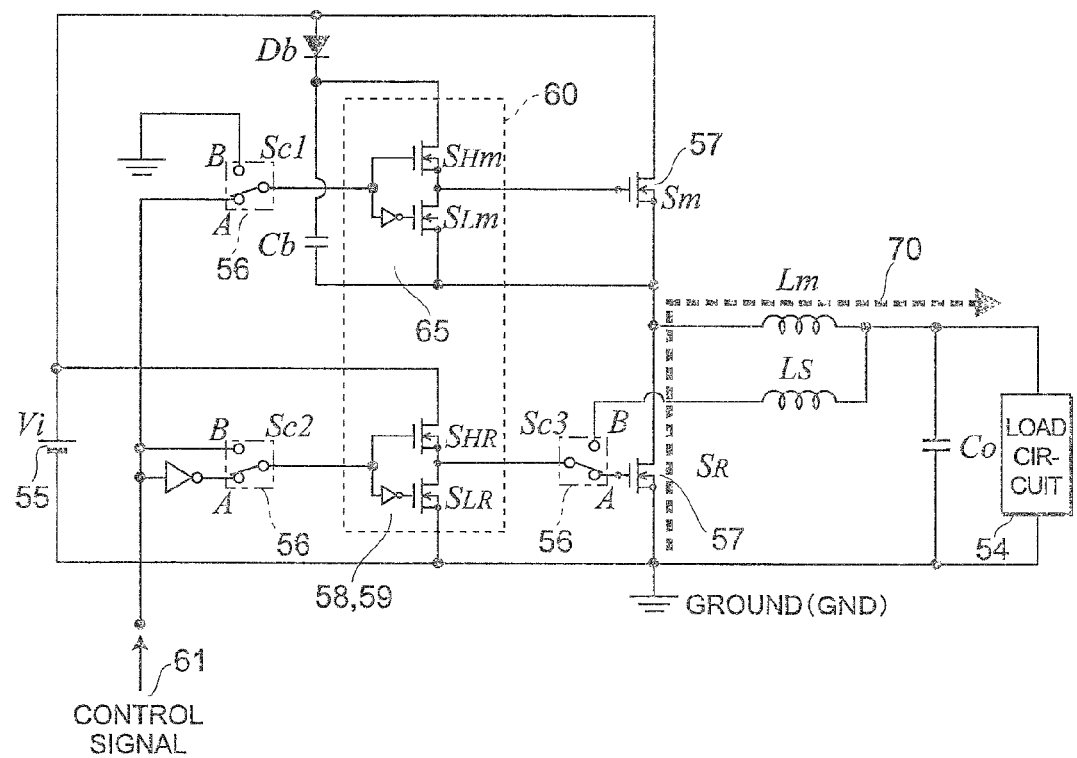
FIG. 10 is a circuit diagram showing an operating state of the power supply apparatus according to the second embodiment of the invention.

(3) FIG. 10 illustrates a state in which the switching unit 56 has selected the first path 52 so that a first inductor Lm supplies power to the load circuit 54. Unlike FIG. 9, however, it shows that the first inductor Lm is grounded, as a MOS transistor SR of a first switch 57 is short-circuited (ON).

Figure 11:
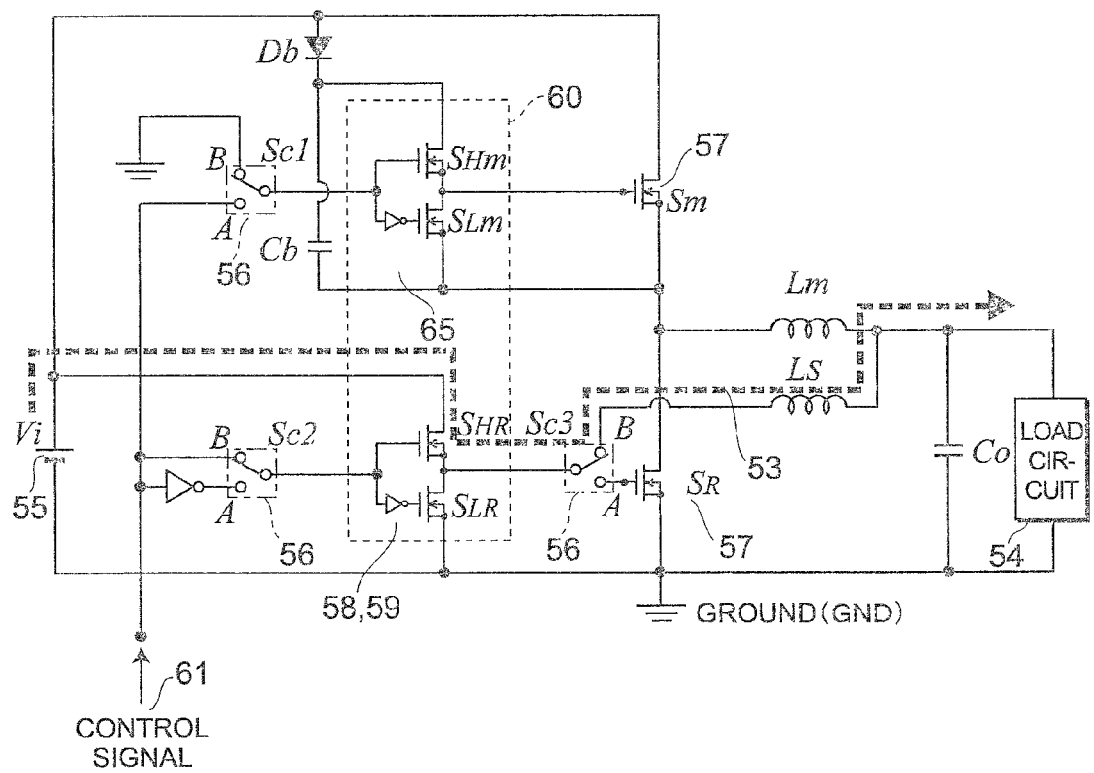
FIG. 11 is a circuit diagram showing an operating state of the power supply apparatus according to the second embodiment of the invention.

(4) FIG. 11 illustrates a state in which the switching unit 56 has selected the second path 53 so that power is supplied from the power source 55 to the load circuit 54 via the second path 53. In particular, it shows the period in which the second path 53 directly connects the power source 55 to the load circuit 54 so that power is supplied from the power source 55 to the load circuit 54 via the second path 53.

Figure 12:
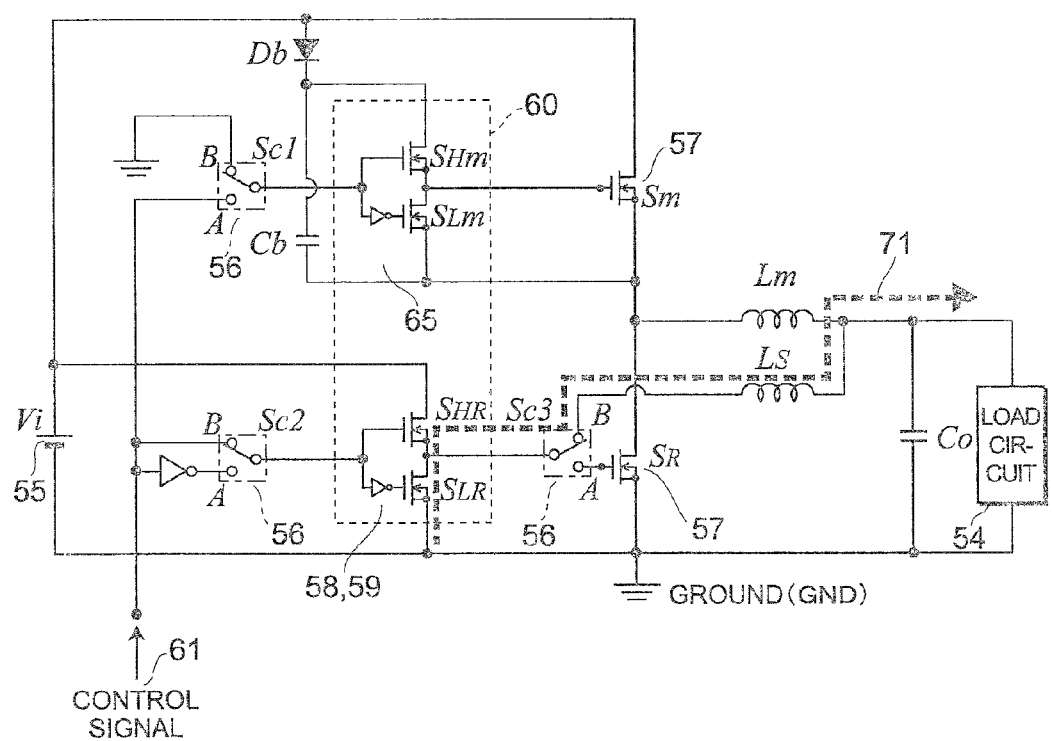
FIG. 12 is a circuit diagram showing an operating state of the power supply apparatus according to the second embodiment of the invention.

(5) FIG. 12 illustrates a state in which the switching unit 56 has selected the second path 53 so that a second inductor Ls supplies power to the load circuit 54. Unlike FIG. 11, however, it shows that the second inductor Ls is grounded, as the MOS transistor SL of a second switch 59 is short-circuited (ON).

(Overall Circuit Configuration)

First, the overall configuration of the circuit shown in FIG. 8 to FIG. 12 will be described.

The power supply apparatus 50 shown in FIG. 8 to FIG. 12 may be regarded as a power supply apparatus without the load circuit 54, or it may be regarded as an electronic circuit including the load circuit 54. The load circuit 54 may be a processor such as a CPU or DSP on which a software program is operated, or an electronic circuit or semiconductor IC that performs specific processing, similarly to the one described in the first embodiment.

The power supply apparatus 50 includes the first path 52 and the second path 53, and has the power source 55 for supplying power to the load circuit 54 via one of the first path 52 and the second path 53. The power source 55 may be a domestic power source, cells, or batteries similarly to the first embodiment.

The power supply apparatus 50 further includes a switching unit 56 that switches between the first path 52 and the second path 53, a first switch 57 that controls a first level of power supplied via the first path 52, an open/close switch 58 (=second switch 59) that controls timing of the opening and closing of the first switch 57, and a second switch 59 that controls a second level of power supplied via the second path 53. The open/close switch 58 and the second switch 59 are an identical element. A driver 60 includes a pair of series-connected MOS transistors SHm and SLm, and a pair of MOS transistors SHR and SLR.

The first switch 57 is formed by a high-side MOS transistor Sm and a low-side MOS transistor SR series-connected across both terminals of the power source 55. The driver 60 is the circuit that includes the second switch 59.

Here, the MOS transistors Sm and SR correspond to the MOS transistors 19 and 20 described above and shown in FIG. 1, the first inductor Lm corresponds to the first inductor 11 described above and shown in FIG. 1, the second inductor Ls corresponds to the second inductor 12 described above and shown in FIG. 1, and the output capacitor Co corresponds to the output capacitor 13 described above and shown in FIG. 1.

The switching unit 56 includes switches Sc1, Sc2, and Sc3. These switches Sc1, Sc2, and Sc3 connect to one of the contacts A and B in the drawing by a control signal 61 to select one of the first path 52 and the second path 53. A logic circuit such as an exclusive-OR circuit may be used for the switches Sc1, Sc2, and Sc3 so that the first path 52 or the second path 53 is selected in accordance with the level of load power.

When the switching unit 56 selects the first path 52, as shown in FIG. 9 or FIG. 10, power is supplied via the first path 52, which is a line that runs outside a driver 58 from the power source 55 to the load circuit 54. In mid-course of the first path 52, there exists a line that is grounded via the MOS transistor SR of the first switch 57. When the MOS transistor SR of the first switch 57 is short-circuited (ON) while the MOS transistor Sm is open-circuited (OFF), power is supplied to the load circuit 54 not from the power source 55 but from the first inductor Lm. On the other hand, when the MOS transistor SR is open-circuited while the MOS transistor Sm is short-circuited, the first path 52 electrically directly connects the power source 55 to the load circuit 54, whereby power is supplied from the power source 55 to the load circuit 54 through the first inductor L.

The MOS transistor SR of the first switch 57 is short-circuited or open-circuited by a signal input to its gate terminal. The signal input to the gate terminal is determined by the MOS transistors SHR and SLR of the open/close switch 58. The MOS transistors SHR and SLR correspond to the MOS transistors 21 and 22 described above and shown in FIG. 1, and the switch Sc3 corresponds to the switch in the switching unit 6 described above and shown in FIG. 1. The MOS transistors SHR and SLR perform switching operations in a symmetric manner. Namely, to control the operations of the MOS transistors SHR and SLR, one of the control signals 61 via the switch SC2 is inverted when input to each gate terminal of the MOS transistors SHR and SLR. For example, when the MOS transistor SHR is short-circuited, the MOS transistor SLR is open-circuited, whereas, contrarily, when the MOS transistor SHR is open-circuited, the MOS transistor SLR is short-circuited.

On the other hand, the MOS transistor Sm of the first switch 57 is short-circuited or open-circuited by a signal input to its gate terminal. The signal input to the gate terminal is determined by the MOS transistors SHm and SLm of the switch 56, which perform switching operations in a symmetric manner. Namely, to control the operations of the MOS transistors SHm and SLm, one of the control signals 61 via the switch SC1 is inverted when input to each gate terminal of the MOS transistors SHm and SLm. For example, when the MOS transistor SHm is short-circuited, the MOS transistor SLm is open-circuited, whereas, contrarily, when the MOS transistor SHm is open-circuited, the MOS transistor SLm is short-circuited.

With these pairs of MOS transistors SHm and SLm, and SHR and SLR operating symmetrically, the input to each gate terminal of the MOS transistors Sm and SR forming the first switch 57 is controlled, whereby the MOS transistors Sm and SR are controlled to be short-circuited or open-circuited. The MOS transistors Sm and SR perform switching operations symmetrically by respective pulse drive signals from the driver 60, whereby it is determined whether power is supplied from the power source 55 to the load circuit 54 through the first inductor Lm, or power is supplied to the load circuit 54 from the first inductor Lm.

On the other hand, when the switching unit 56 selects the second path 53, as shown in FIG. 11 and FIG. 12, power is supplied via the second path 53 that connects the power source 55 to the load circuit 54 via the driver 60. The second path 53 runs via the MOS transistor SHR of the second switch 59. Since the second switch 59 is the same element as the open/close switch 58, it includes the pair of MOS transistors SHR and SLR. By short-circuiting or open-circuiting of the pair of MOS transistors SHR and SLR, it switches between a state in which power is supplied from the power source 55 to the load circuit 54 via the second path 53 through the second inductor Ls, and another state in which energy accumulated in the second inductor Ls is supplied to the load circuit 54 as electrical power. In the second path 53, only the MOS transistor SHR of the second switch 59 switches between a conductive state and a non-conductive state, and therefore the second level of power supplied to the load circuit 54 via the second path 53 is determined only by the operation of the MOS transistor SHR.

The pairs of MOS transistors SHm and SLm, or SHR and SLR, are short-circuited or open-circuited by their symmetrical operations as described above. In order to be short-circuited and open-circuited symmetrically, the MOS transistors SH and SL may be formed by a P-MOS transistor and an N-MOS transistor, or, as shown in FIG. 8, they may be configured such that the logic values of the signal input to their gate terminals are always opposite. In the power supply apparatus 50 shown in FIG. 8 to FIG. 12, inverters are inserted upstream of the gate terminals of both of the low-side MOS transistors SLm and SLR so that the logic values of the signal input to the gate terminals of the MOS transistors SLm and SLR are opposite relative to those of the original control signal 61.

(Description of Operation)

Next, the operation of the power supply apparatus 50 will be described with reference to FIG. 8 to FIG. 12.

(Power Supply Period Via the First Path Shown in FIG. 9)

In FIG. 9, the switching unit 56 is selecting the first path 52. Therefore, power is supplied from the power source 55 to the load circuit 54 via the first path 52. With the terminals A and outputs being short-circuited at the switches SC1, SC2, and SC3 that form the switching unit 56, the control signal 61 is input to the gate terminals of the pair of MOS transistors SHm and SLm via the switch SC1, as well as input to the gate terminals of another pair of MOS transistors SHR and SLR via the switch SC2.

The drain terminal of the MOS transistor SHR is connected to the power source 55, while the source of the MOS transistor SLR is grounded. The source terminal of the MOS transistor SHR and the drain terminal of the MOS transistor SLR are connected to each other, and a pulse drive signal is output from this connection point via the switch SC3 to the gate terminal of the MOS transistor SR.

The drain terminal of the MOS transistor SHm is connected to the power source 55 via a diode Db, while the source of the MOS transistor SLm is connected to the connection point between the MOS transistors Sm and SR. The source terminal of the MOS transistor SHm and the drain terminal of the MOS transistor SLm are connected to each other, and a pulse drive signal is output from this connection point to the gate terminal of the MOS transistor Sm.

When the control signal 61 is input with a certain logic value (of a high level), a low-level control signal is input to the gate terminal of the MOS transistor SHR, while the high-level control signal is input to the gate terminal of the MOS transistor SLR. Thereby, the MOS transistor SHR is open-circuited, while the MOS transistor SLR is short-circuited. When the MOS transistor SLR is short-circuited, a signal based on the ground voltage input to the source terminal of the MOS transistor SLR is output to the drain terminal of the MOS transistor SLR. In other words, the open/close switch 58 outputs a low-level pulse drive signal. This low-level pulse drive signal is input to the gate terminal of the MOS transistor SR. If the MOS transistors Sm and SR forming the first switch 57 are N-MOS transistors, when this low-level signal is input to the gate terminal of the MOS transistor SR, the MOS transistor SR is open-circuited so that the first path 52 is not electrically connected to the ground. At this time, the MOS transistor Sm is short-circuited, so that power is supplied from the power source 55 to the load circuit 54 via the first path 52 through the first inductor Lm.

On the contrary, as shown in FIG. 8 to FIG. 12, if the MOS transistors Sm and SR are P-MOS transistors, when a low-level control signal 61 is input, the MOS transistor SR is open-circuited while the MOS transistor Sm is short-circuited. In this case, too, power is supplied from the power source 55 to the load circuit 54 via the first path 52 through the first inductor Lm.

The first switch 57 includes the MOS transistors Sm and SR having a large device size, and since power is supplied by these MOS transistors Sm and SR, switching of these MOS transistors leads to a large loss or power consumption. However, the MOS transistors Sm and SR need to have a large device size so as to be able to accommodate high power.

As described above, the control signal 61 controls the switching unit 56 and the open/close switch 58 so as to supply power from the power source 55 to the load circuit 54 via the first path 52.

The control signal 61 may be output from an external controller (not shown). The controller is preliminarily provided with a logic circuit or software program, so that it controls the switching of the switching unit 56 or the short-circuiting or open-circuiting of the open/close switch 58 in accordance with the processing steps of the logic operation or software program.

The supply of power from the power source 55 via the first path 52 is controlled, as described above, not only by short-circuiting the first switch 57 (MOS transistor SR) to the ground, but also by switching the MOS transistor Sm.

The MOS transistor Sm is located on the first path 52, and during the period in which the MOS transistor Sm is short-circuited while the MOS transistor SR is open-circuited (namely, in a state in which the first path 52 is not electrically connected to the ground), power is supplied from the power source 55 to the load circuit 54. On the other hand, during the period in which the MOS transistor Sm is open-circuited while the MOS transistor SR is short-circuited (namely, in a state in which the first path 52 is electrically connected to the ground), power is not supplied from the power source 55 to the load circuit 54. Namely, by alternately and repeatedly short-circuiting and open-circuiting the MOS transistors Sm and SR, there are repeatedly generated a supply period and a non-supply period of power from the power source 55 to the load circuit 54 via the first path 52. The level of power given to the load circuit 54 is determined by an integral of these supply period and non-supply period of power from the power source 55.

The MOS transistor Sm is switched between the short-circuit state and open-circuit state by a switch 65 contained in the driver 60. The switch 65 includes the pair of MOS transistors SHm and SLm, and controls the MOS transistor Sm to be short-circuited or open-circuited by outputting a pulse drive signal from the connection point between the pair of MOS transistors SHm and SLm to the gate terminal of the MOS transistor Sm. The switch 65 is controlled by the control signal 61 via the switch Sc1. When the switch Sc1 is connected to the contact A, if the logic value of the control signal 61 is at a predetermined level (high level), the MOS transistor SHm of the switch 65 is short-circuited, and a high-level pulse drive signal is input to the gate terminal of the MOS transistor Sm. If the logic value of the control signal 61 is opposite from the predetermined level, the MOS transistor SL of the switch 65 is short-circuited, and a low-level pulse drive signal is input to the gate terminal of the MOS transistor Sm. Thus the MOS transistor Sm is switched between the short-circuit state and open-circuit state depending on the logic value of the signal input to its gate terminal.

(Non-Power Supply Period Via the First Path in FIG. 10)

In FIG. 10, the switching unit 56 is selecting the first path 52 similarly to FIG. 9. With the terminals A and outputs being short-circuited at the switches SC1, SC2, and SC3 that form the switching unit 56, the control signal 61 is input to the gate terminals of the pair of MOS transistors SHm and SLm via the switch SC1, as well as input to the gate terminals of another pair of MOS transistors SHR and SLR via the switch SC2.

Here, the control signal 61 outputs a signal having a logic value opposite from that of the signal in FIG. 9.

Namely, when the control signal 61 is input at a low level, a high-level control signal is input to the gate terminal of the MOS transistor SHR, while the low-level control signal is input to the gate terminal of the MOS transistor SLR. Thereby, the MOS transistor SHR is short-circuited, while the MOS transistor SLR is open-circuited. In this case, the open/close switch 58 outputs a signal from the power source 55 through the short-circuited MOS transistor SHR to the MOS transistor SR. In other words, the logic value of the pulse drive signal output from the open/close switch 58 to the MOS transistor SR has a high level. If the MOS transistors Sm and SR forming the first switch 57 are N-MOS transistors, when a high-level pulse drive signal is input to their gate terminals, they are short-circuited, so that the source terminal and the drain terminal are short-circuited. As the source terminal of the MOS transistor SR is connected to the ground, a midway portion of the first path 52 and the ground are connected. At this time, the MOS transistor Sm is open-circuited, so that the power supply from the power source 55 is shut off, and energy accumulated in the first inductor Lm is supplied to the load circuit 54 via the path 70 as electrical power.

On the contrary, as shown in FIG. 8 to FIG. 12, if the MOS transistors Sm and SR are P-MOS transistors, when the high-level control signal 61 is input, the MOS transistor SR is short-circuited while the MOS transistor Sm is open-circuited. In this case, too, power supply from the power source 55 is shut off, and energy accumulated in the first inductor Lm is supplied to the load circuit 54 via the path 70 as electrical power.

The first switch 57 is finely switched between the short-circuit state and open-circuit state during a predetermined period. This switching induces supply periods and non-supply periods, shown in FIG. 9 and FIG. 10, of power from the power source 55. The first level of power supplied to the load circuit 54 is determined by an integral of these supply periods and non-supply periods during a predetermined period. This is the same as the previous embodiment described with reference to FIG. 3. If the supply period of power from the power source 55 becomes longer during the predetermined period, the resultant first level of power supplied to the load circuit 54 becomes higher.

In this manner, the control signal 61 is supplied via the switching unit 56 and the driver 60, so that the power supply via the first path 52 as well as the level of its power supplied is controlled.

Namely, as described with regard to the power supply period via the first path 52, by open-circuiting and short-circuiting (switched by the switch 65) the MOS transistor Sm arranged on the first path 52 symmetrically to the MOS transistor SR, the non-supply period of power via the first path 52 is controlled.

(Power Supply Period Via the Second Path in FIG. 11)

Next, the power supply period via the second path will be described with reference to FIG. 11.

In FIG. 11, the switching unit 56 is selecting the second path 53. Therefore, power is supplied from the power source 55 to the load circuit 54 via the second path 53. With the terminals B and outputs being short-circuited at the switches SC1, SC2, and SC3 that form the switching unit 56, the control signal 61 is input to the gate terminals of the pair of MOS transistors SHR and SLR that form the second switch 59 via the switch SC2. On the other hand, as the terminal B of the switch Sc1 is grounded, the MOS transistor SHm of the switch 65 is open-circuited, while the MOS transistor SLm is short-circuited, so that the gate and the source of the MOS transistor Sm have the same potential, keeping the MOS transistor Sm open-circuited.

The drain terminal of the MOS transistor SHR is connected to the power source 55, while the source of the MOS transistor SLR is grounded. The source terminal of the MOS transistor SHR and the drain terminal of the MOS transistor SLR are connected to each other, and a signal is output from this connection point to the B terminal of the switch SC3. The B terminal of the switch SC3 can output the signal to the load circuit 54 through the second inductor Ls.

When the control signal 61 is input with a certain logic value (of a high level), the MOS transistor SHR is short-circuited, while the MOS transistor SLR is open-circuited. In this case, the second switch 59 outputs a signal from the power source 55 through the short-circuited MOS transistor SHR. In other words, power from the power source 55 is output to the load circuit 54 via the second switch 59 in midway of the second path 53 through the second inductor Ls, so that energy is accumulated in the second inductor Ls. As shown in FIG. 11, the power source 55 is electrically connected to the load circuit 54 via the second switch 59. The power supply via the second path 53 is controlled only by the opening and closing of this second switch 59. The period of power supply from the power source 55 is the time during which the MOS transistor SHR is short-circuited and the second switch 59 is outputting a signal from the power source 55.

The second switch 59 includes the MOS transistors SHR and SLR having a small device size. When power is supplied via the second path 53, the second level of power which is low power is supplied, and therefore these MOS transistors SHR and SLR do not need to be large devices that have low ON-resistance. Accordingly, the MOS transistors SHR and SLR are formed by small devices. Since the MOS transistors SHR and SLR are small devices, switching of these transistors causes only a small loss or power consumption. In particular, since the MOS transistor SR that is a large device is not used in the power supply via the second path 53, loss or power consumption can be kept low.

Thus, when supplying, a small level of power, instead of a high level of power, by using another path (second path 53) that is different from the path using large devices, the loss or power consumption in the power supply apparatus 50 or electronic circuit can be reduced, and thereby a power supply apparatus that can efficiently cover a wide range of loads from light load to heavy load can be provided. Further, since the second switch 59 that controls power supply via the second path 53 is the same element as the open/close switch 58 that controls the first switch in the control of power supply via the first path 52, the circuit scale is not increased. Further, since the open/close switch 58 is a circuit implemented as a driver 60 by a circuit substrate or semiconductor IC, it is originally provided with a noise prevention feature. Therefore, using the open/close switch 58 also as the second switch 59 does not lead to an increase in noise.

As described above, power is supplied from the power source 55 to the load circuit 54 via the second path 53 as the control signal 61 is output to the second switch 59 through the switching unit 56.

The control signal 61 may be output from an external controller (not shown). The controller is preliminarily provided with a logic circuit or software program, so that it controls the switching of the switching unit 56 or the short-circuiting and open-circuiting of the second switch 59 in accordance with the processing steps of the logic operation or software program.

(Non-Power Supply Period Via the Second Path in FIG. 12)

In FIG. 12, the switching unit 56 is selecting the second path 53 similarly to FIG. 11.

Here, the control signal 61 outputs a signal having a logic value opposite from that of the signal in FIG. 11. Namely, when the control signal 61 is input at a low level to the gate terminals of the MOS transistors SHR and SLR, the MOS transistor SHR is open-circuited, while the MOS transistor SLR is short-circuited. When the MOS transistor SLR is short-circuited, one terminal of the second inductor Ls that is connected to the contact B of the switch Sc3 is grounded, whereby the energy that has been accumulated in the second inductor Ls is discharged to the load circuit 54.

When the MOS transistor SLR is short-circuited as described above, the load circuit 54 is cut off from the power source 55, and no power is supplied from the power source 55. This period in which no power is supplied from the power source 55 is the non-supply period. In this non-supply period, power is supplied to the load circuit 54 via a path 71 from the second inductor Ls.

The second switch 59 is finely switched between the short-circuit state and open-circuit state during a predetermined period. This switching creates power supply periods and non-power supply periods shown in FIG. 11 and FIG. 12. The second level of power supplied to the load circuit 54 is determined by an integral of these supply periods and non-supply periods during a predetermined period. This is the same as the previous embodiment described with reference to FIG. 5.

As described above, the control signal 61 is output to the second switch 59 through the switching unit 59 and thereby the supply of power via the second path 53 and the level of power supplied is controlled. In actuality, the second level of power is determined by an integral between the power supply periods shown in FIG. 11 and non-power supply periods shown in FIG. 12. For example, if the supply period of power from the power source 55 becomes longer, the second level of power supplied to the load circuit 54 becomes higher.

As can be seen from the above, in order for the first level of power to be supplied via the first path 52, the state in which the power source 55 is electrically connected to the load circuit 54 and the state in which the ground is electrically connected to the load circuit 54 are switched over by controlling the switching unit 56, open/close switch 58, and first switch 57.

On the other hand, in order for the second level of power to be supplied via the second path 53, the state in which the power source 55 is electrically connected to the load circuit 54 and the state in which the ground is electrically connected to the load circuit 54 are switched over by controlling only the switching unit 56 and the second switch 59 (=open/close switch 58). Therefore, the power supply apparatus 50 has a mechanism that suppresses unnecessary switching loss or switching noise when supplying the second level of power which is low power.

As described above, the power supply apparatus according to the second embodiment can efficiently supply high power and low power respectively required by the load circuit without causing an increase in circuit scale, loss, or power consumption.

The power supply apparatus or electronic circuit described in the first and second embodiments may be implemented by a semiconductor IC.

Third Embodiment

Next, a third embodiment will be described with reference to the circuit diagram of FIG. 13. As shown in the drawing, in this power supply apparatus 50 shown here, the first inductor Lm and the second inductor Ls described in the second embodiment above are formed as a common inductor Lms.

Here, as a main circuit of the power supply apparatus 50, a step-down converter 75 is provided, which includes MOS transistors Sm and SR that form the first switch 57, and the inductor Lms that serves as a means for accumulating and discharging energy, for generating an output voltage lower than the input voltage Vi of the power source 55 and for supplying the voltage to the output capacitor Co and the load circuit 54 by the switching operation of the MOS transistors Sm and SR. The step-down converter 75 itself is provided also in the first and second embodiments described above. In this embodiment, in particular, the first inductor Lm interposed in the first path 52 and the second inductor Ls interposed in the second path 53 are formed as a common inductor Lms, thereby further simplifying the circuit configuration.

Figure 13:
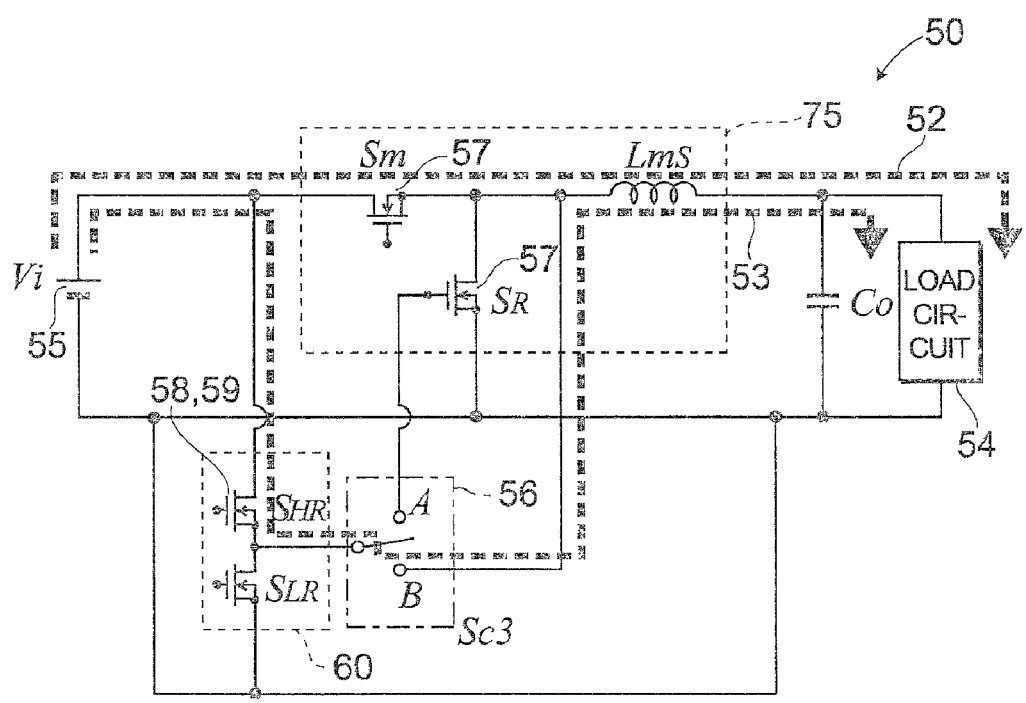
FIG. 13 is a circuit diagram of the power supply apparatus according to a third embodiment of the invention.

The configuration of the power supply apparatus 50 is partly omitted in FIG. 13 to avoid repetitive description. The structure and operation other than the inductor Lms are the same as those of the second embodiment and will not be repetitively described.

Fourth Embodiment

Figure 14:
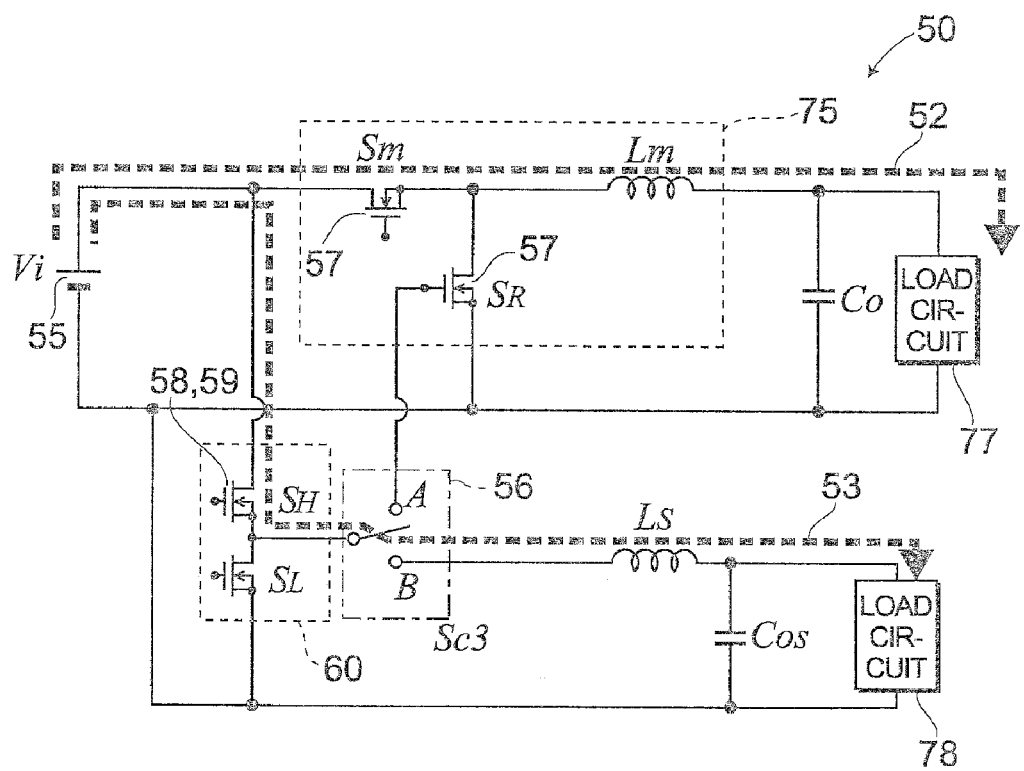
FIG. 14 is a circuit diagram of the power supply apparatus according to a fourth embodiment of the invention.

Next, a fourth embodiment will be described with reference to the circuit diagram of FIG. 14. The point that should be remarked in the drawing is that a first output capacitor Co and a first load circuit 77 to which power is supplied via the first path 52, and a second output capacitor Co and a second load circuit 78 to which power is supplied via the second path 53, are separately provided. Other structure and operation are the same as those of the second embodiment and will not be repetitively described.

Here, too, as a main circuit of the power supply apparatus 50, a step-down converter 75 consisting of the MOS transistors Sm and SR and the first inductor Lm is provided. The first inductor Lm interposed in the first path 52 and the second inductor Ls interposed in the second path 53 are separately provided. The parallel circuit of the first output capacitor Co and the first load circuit 77 is connected to the output side of the step-down converter 75, while the parallel circuit of the second output capacitor Co and the second load circuit 78 is connected to the output side of another step-down converter that consists of the MOS transistors SH and SL forming the second switch 59, and the second inductor Ls.

When symmetrically switching the MOS transistors SH and SL of the driver 60, with the terminal A short-circuited to the output of the driver 60 in the switch Sc3 of the switching unit 56, the MOS transistors Sm and SR that form the step-down converter 75 are allowed to symmetrically switch, too, whereby power is supplied from the power source 55 to the load circuit 77 via the first path 52. In this state, as the load circuit 78 is cut off from the driver 60, no power is supplied to the load circuit 78.

On the other hand, when the terminal B of the switch Sc3 in the switching unit 56 is short-circuited to the output of the driver 60, supply of pulse drive signals to the MOS transistors Sm and SR is interrupted, which stops the operation of the step-down converter 75, so that no power is supplied to the load circuit 77. During this period in which the operation of the step-down converter 75 is stopped, the second switch 59 forming the driver 60 of the MOS transistor SR operates as a power source that supplies power to another load circuit 78. Namely, by symmetrically switching the MOS transistors SH and SL that form the second switch 59, power can be supplied from the power source 55 to the load circuit 78 via the second path 53.

Fifth Embodiment

Figure 15:
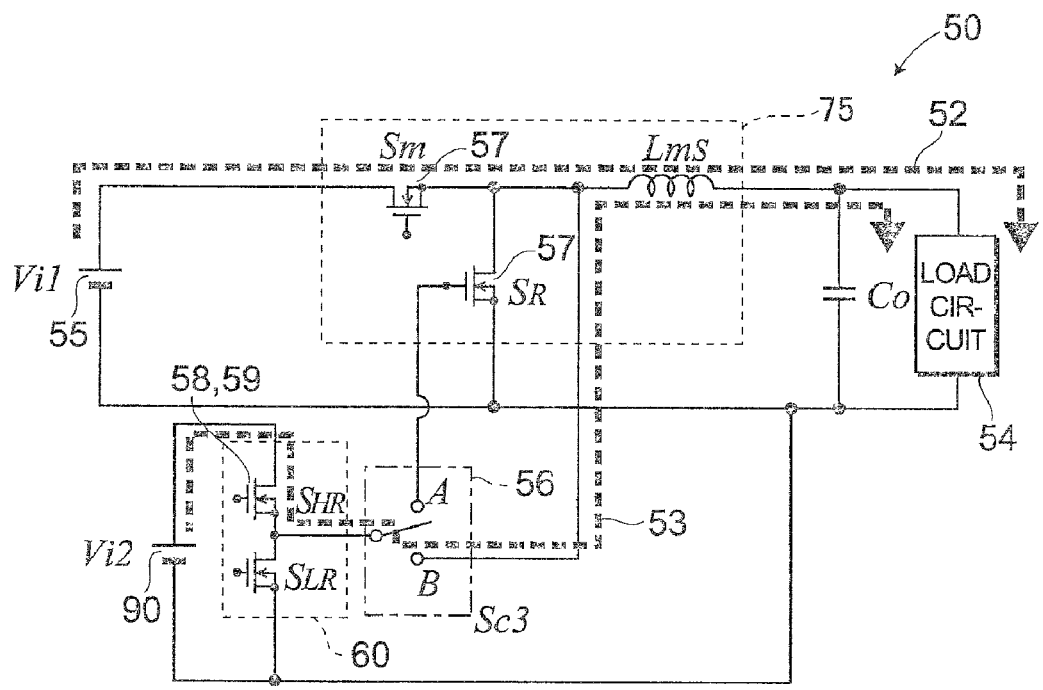
FIG. 15 is a circuit diagram of the power supply apparatus according to a fifth embodiment of the invention.

Next, a fifth embodiment will be described with reference to the circuit diagram of FIG. 15. What should be noted in the drawing is that there are provided a first power source 55 that supplies power to the load circuit 54 via the first path 52, and a second power source 90 that supplies power to the load circuit 54 via the second path 53 and is different from the first power source 55. Namely, here, an input voltage Vi1 is applied from the power source 55 to the step-down converter 75, while an input voltage Vi2 is applied from the power source 90 to the driver 60, and the voltage applied to the driver 60 can be independently set by the power source 90, without depending on the input voltage Vi1 from the power source 55. Other structure and operation are the same as those of the fourth embodiment and will not be repetitively described.

Sixth Embodiment

Next, a sixth embodiment will be described with reference to the circuit diagram of FIG. 16. The point that should be remarked in the drawing is that, unlike the first to fifth embodiments described above, a step-up converter 81 is provided as a main circuit of a power supply apparatus 80. This step-up converter 81 includes an inductor L that is a means for accumulating and discharging energy, a MOS transistor Sm as a first switch, and a diode D which becomes conductive when the MOS transistor Sm is open-circuited to send out the energy from the power source 55 and the inductor L to the output capacitor Co and the load circuit 54. It generates an output voltage higher than the input voltage Vi of the power source 55 by the switching operation of the MOS transistor Sm and supplies the voltage to the output capacitor Co and the load circuit 54.

The step-up converter 81 is formed such that one terminal of the inductor L is connected to the positive terminal of the power source 55, the drain of the MOS transistor Sm is connected to the other terminal of the inductor L, while the source of the MOS transistor Sm is connected to the negative terminal of the power source 55, and the anode of the diode D is connected to the connection point between the inductor L and the MOS transistor Sm. The parallel circuit of the output capacitor Co and the load circuit 54 is connected across the cathode of the diode D and the negative terminal of the power source 55.

A pair of MOS transistors SH and SL are series-connected across the cathode of the diode D and the negative terminal of the power source 55 as the driver 60 of the MOS transistor Sm. Control signals with symmetric voltage levels are supplied to the gate terminals of the MOS transistors SH and SL. Further, a switch Sc for connecting the connection point between the MOS transistors SH and SL to either the gate of the MOS transistor Sm or the other terminal of the inductor L is provided as the switching unit 56. The switching unit 56 has a function of switching between a high-power first path 82 for supplying power from the power source 55 to the load circuit 54 via outside the driver 60 and a low-power second path 83 for supplying power from the power source 55 to the load circuit 54 via inside the driver.

Next, the operation in the above construction will be described. When control signals that are symmetric to each other are given to the gates of the MOS transistors SH and SL, with the terminal A of the switch Sc forming the switching unit 56 being short-circuited to the output, a pulse drive signal is supplied to the gate of the MOS transistor Sm via the switch Sc, from the connection point of the MOS transistors SH and SL that form the open/close switch 58 of the driver 60. When the voltage of the pulse drive signal rises to a high level, the MOS transistor Sm is short-circuited, so that the input voltage Vi of the power source 55 is applied across both terminals of the inductor L, whereby energy is accumulated in the inductor L. The diode D is not conductive at this time, so that the energy accumulated in the output capacitor Co is supplied to the load circuit 54 as electrical power.

When the voltage of the pulse drive signal lowers to a low level, the MOS transistor Sm is open-circuited to make the diode D conductive, so that the energy accumulated in the power source 55 and the inductor L is supplied to the output capacitor Co and the load circuit 54 via the first path 82 through the diode D. At this time, an output voltage higher than the input voltage Vi can be supplied to the load circuit 54, as the voltage generated across the terminals of the output capacitor Co is produced as a result of superimposing the input voltage Vi of the power source 55 on the counterelectromotive voltage generated in the inductor L.

As descried above, when the switching unit 56 selects the first path 82, power from the power source 55 is supplied to the load circuit 54 through the MOS transistor Sm and diode D that are designed for high power applications. Therefore, when the load circuit 54 is in a heavy load state, power can be supplied with high efficiency through the first path 82.

On the other hand, when control signals that are symmetric to each other are given to the gates of the MOS transistors SH and SL, with the terminal B of the switch Sc forming the switching unit 56 being short-circuited to the output, the MOS transistors SH and SL switch symmetrically to each other as the second switch 59 for supplying power from the power source 55 to the load circuit 54 via the second path 83. At this time, the MOS transistor Sm of the step-up converter 81 is kept open-circuited, as the supply of the pulse drive signal to its gate is interrupted, and therefore the power supply via the first path 82 is stopped.

In this state, when the MOS transistor SH is open-circuited while the MOS transistor SL is short-circuited, the input voltage Vi of the power source 55 is applied across both terminals of the inductor L, whereby energy is accumulated in the inductor L, and the energy accumulated in the output capacitor Co is supplied to the load circuit 54 as electrical power.

Then, when the MOS transistor SH is short-circuited while the MOS transistor SL is open-circuited, the energy accumulated in the power source 55 and the inductor L is supplied from the switch Sc via the second path 83 through the MOS transistor SH to the output capacitor Co and the load circuit 54. At this time, an output voltage higher than the input voltage Vi can be supplied to the load circuit 54, as the voltage generated across the terminals of the output capacitor Co is produced as a result of superimposing the input voltage Vi of the power source 55 on the counter electromotive voltage generated in the inductor L.

As described above, when the switching unit 56 selects the second path 83, power from the power source 55 is supplied to the load circuit 54 through the MOS transistors SH and SL, which are originally designed for low power applications such as for switching the MOS transistor Sm. Therefore, when the load circuit 54 is in a light load state, power can be supplied with high efficiency through the second path 83, and thus, a power supply apparatus 80 that can as a whole efficiently cover a wide range of loads from light load to heavy load can be provided.

Figure 16:
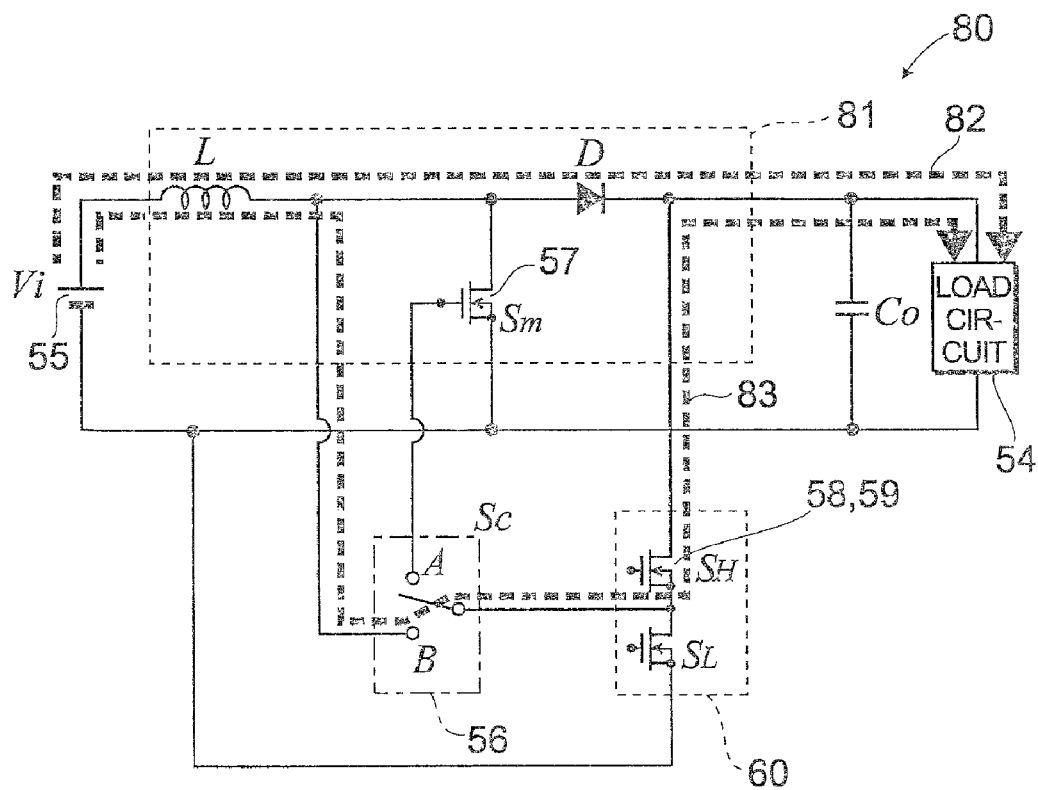
FIG. 16 is a circuit diagram of the power supply apparatus according to a sixth embodiment of the invention.

In the circuit configuration of FIG. 16, for example, the terminal B may be connected to the connection point between the positive terminal of the power source 55 and one terminal of the inductor L instead of the other terminal of the inductor L, and another inductor may be interposed therebetween, so as to provide separate inductors for the first path 82 and the second path 83. The diode D of the step-up converter 81 may be a switching element equipped with a control terminal, which operates symmetrically to the MOS transistor Sm. Further, as has been described in the fourth embodiment, a first output capacitor and a first load circuit to which power is supplied via the first path 82 and a second output capacitor and a second load circuit to which power is supplied via the second path 83 may be separately provided, or the controller 40, the switch controller 41, and/or the detector 42 may be incorporated, i.e., various features of the above-described first to fourth embodiments may be incorporated as required.

Seventh Embodiment

Next, a seventh embodiment will be described.

The power supply apparatus or electronic circuit described in the first to sixth embodiments may be accommodated and incorporated in the housing of an electronic equipment and used with a control circuit for controlling the electronic circuit. In particular, for equipment such as notebook PCs, mobile terminals, car navigation systems, PDAs, vehicle-mounted TVs, and mobile phones to which power is supplied from batteries, power supply needs to be finely controlled in order to make the available time longer. There are cases where high power is required and low power is required depending on the contents of operation in such electronic equipment. When high power is required, the power supply apparatus supplies the first level of power via the first path, while, when low power is required, the power supply apparatus supplies the second level of power via the second path.

Here, power consumption of the electronic equipment as a whole can be reduced in the following two respects: (1) As the power supply apparatus can supply high power and low power in a switchable manner, power consumption of the electronic equipment as a whole can be reduced; and (2) As the loss or power consumption is minimized when supplying low power (the second level of current being controlled by the switching of the second switch which is a small device), the power consumption of the power supply apparatus can be reduced.

This results in the merit of longer available time of the electronic equipment, as the battery usage efficiency in the electronic equipment is increased.

One example of the electronic equipment will be described.

Figure 17:
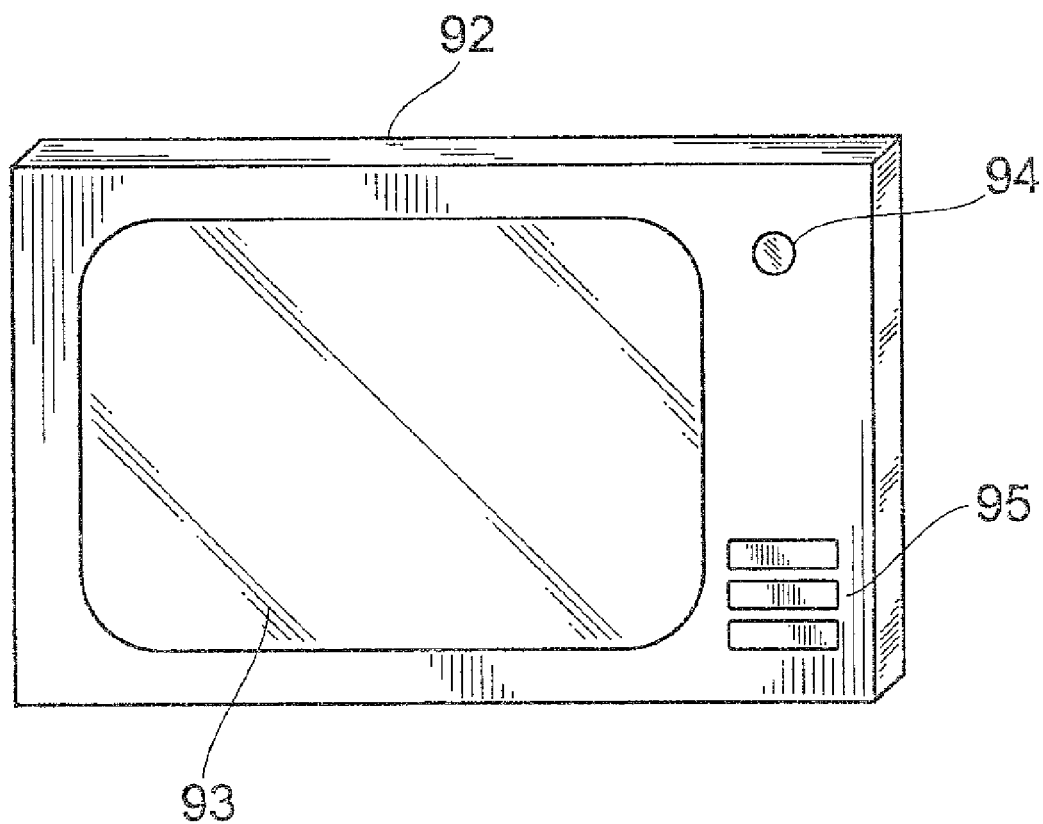
FIG. 17 is a perspective view of electronic equipment according to a seventh embodiment of the invention.

FIG. 17 shows one example of the electronic equipment. FIG. 17 is a perspective view of the electronic equipment in the seventh embodiment. An electronic equipment 92 is one that is required to be thin and small, such as a car TV or a personal monitor.

The electronic equipment 92 includes a display 93, a light-emitting element 94, and a speaker 95. The power supply apparatus 1, 50, or 80 is incorporated in this electronic equipment 92 for providing an efficient supply of power. As a result, the electronic equipment 92 accomplishes low power consumption.

As described above, by incorporating the power supply apparatus 1, 50, or 80 described in the first to sixth embodiments in the electronic equipment 92, the performance of the electronic equipment 92 is improved, whereby its usability is improved. Of course, the power supply apparatus 1, 50, or 80 described in the first to sixth embodiments can be effectively used in stationary electronic equipment at home or in offices. By using the power supply apparatus 1, 50, or 80 described in the first to sixth embodiments in such stationary electronic equipment (such as desktop PCs, TV image receivers, audio equipment, and information processing equipment), the electronic equipment will achieve a reduction in power consumption.

It should be noted that the power supply apparatus or electronic equipment described in the first to seventh embodiments are examples for describing the subject matter of the present invention, and the invention includes various modifications and alterations that can be made without departing from the scope of the invention.

DESCRIPTION OF REFERENCE NUMERALS 1, 50, 80 power supply apparatus
2, 52, 82 first path
3, 53, 83 second path
4, 54 load circuit
5, 55 power source
6, 56 switching unit
7, 57 first switch
8, 58 open/close switch
9, 59 second switch
10, 60 driver

The invention claimed is:

1. A power supply apparatus, comprising:
a power source that supplies power to a load circuit via one of a first path and a second path that is different from the first path;
a switching unit that switches between the first path and the second path;
a first switch that controls a supply period that provides a reference for a first level of power supplied via the first path;
a driver including an open/close switch that controls timing of opening and closing of the first switch; and a second switch that controls a supply period that provides a reference for a second level of power supplied via the second path, wherein the first level of power is higher than the second level of power, the first path runs through outside of the driver while the second path runs through inside of the driver, and the open/close switch and the second switch are a common element.

2. The power supply apparatus according to claim 1, further comprising a step-down converter having the first switch and an inductor for generating an output voltage that is lower than an input voltage of the power source by switching of the first switch and supplying power to the load circuit via the first path.

3. The power supply apparatus according to claim 1, further comprising a step-up converter having the first switch and an inductor for generating an output voltage that is higher than an input voltage of the power source by switching of the first switch and supplying power to the load circuit via the first path.

4. The power supply apparatus according to claim 1, wherein the first switch and the second switch respectively include a first pulse switch and a second pulse switch that switch between supply and non-supply of power based on time, the first pulse switch and the second pulse switch controlling the supply period based on a pulse width, and the first level of power and the second level of power are determined by the pulse width.

5. The power supply apparatus according to claim 4, wherein the first pulse switch and the second pulse switch respectively include an MOS transistor that is controlled to open and close by a signal input to a gate terminal thereof.

6. The power supply apparatus according to claim 5, wherein the second pulse switch includes a pair of series-connected MOS transistors.

7. The power supply apparatus according to claim 5, wherein when the switching unit selects the first path, an output of the open/close switch is input to the gate of the MOS transistor contained in the first pulse switch so as to control opening and closing periods of the first pulse switch, which opening and closing periods of the first pulse switch determine the supply period and determine the first level of power, whereas when the switching unit selects the second path, opening and closing periods of the second pulse switch determine the supply period and determine the second level of power.

8. The power supply apparatus according to claim 1, wherein the load circuit further includes a detector that detects which of the first level of power and the second level of power is required.

9. The power supply apparatus according to claim 8, wherein the detector detects which of the first level of power and the second level of power is required based on an operation mode of the load circuit.

10. The power supply apparatus according to claim 1, further comprising a controller that controls selection of one of the first path and the second path at the switching unit.

11. The power supply apparatus according to claim 1, further comprising a switch controller that controls timing of opening and closing of the second switch.

12. The power supply apparatus according to claim 1, wherein the power source is formed by a first power source for supplying power to the load via the first path, and a second power source different from the first power source for supplying the power via the second path.

* * * * *